US012348254B2

(12) United States Patent
Uo

(10) Patent No.: US 12,348,254 B2
(45) Date of Patent: Jul. 1, 2025

(54) DETECTION CIRCUIT AND COMMUNICATION SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toyoaki Uo, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 338 days.

(21) Appl. No.: 17/943,007

(22) Filed: Sep. 12, 2022

(65) Prior Publication Data
US 2023/0308126 A1    Sep. 28, 2023

(30) Foreign Application Priority Data

Mar. 24, 2022  (JP) ................. 2022-049090

(51) Int. Cl.
*H04B 1/16*    (2006.01)
*H01Q 1/38*    (2006.01)
*H04B 1/18*    (2006.01)

(52) U.S. Cl.
CPC ............ *H04B 1/1607* (2013.01); *H01Q 1/38* (2013.01); *H04B 1/18* (2013.01)

(58) Field of Classification Search
CPC .......... H04B 1/16; H04B 1/1607; H04B 1/18; H04B 1/38; H01Q 1/38; G01R 31/12; G01R 31/1227
See application file for complete search history.

(56) References Cited

U.S. PATENT DOCUMENTS

| | | | |
|---|---|---|---|
| 6,963,230 B2 * | 11/2005 | Morishita | G05F 1/465 327/77 |
| 8,782,503 B2 | 7/2014 | Kaeriyama | |
| 9,224,670 B2 | 12/2015 | Kaeriyama | |
| 9,274,167 B2 | 3/2016 | Huang et al. | |

(Continued)

FOREIGN PATENT DOCUMENTS

| | | |
|---|---|---|
| JP | 2002051544 A | 2/2002 |
| WO | 2021146672 A1 | 7/2021 |

OTHER PUBLICATIONS

Kugelstadt, T., "New Digital Capacitive Isolators Training Guide", ISO74xx & ISO75xx, Feb. 2010, Texas Instruments, pp. 1-17.

(Continued)

*Primary Examiner* — Siu M Lee
(74) *Attorney, Agent, or Firm* — Kim & Stewart LLP

(57) ABSTRACT

According to one embodiment, there is provided a detection circuit including a first insulating element, a second insulating element, a first transmission test circuit, a second transmission test circuit, and a reception test circuit. The first transmission test circuit is connected to the first insulating element. The second transmission test circuit is connected to the second insulating element. The reception test circuit is connected to each of the first insulating element and the second insulating element to output a detection signal corresponding to a difference between a voltage of the first insulating element and a voltage of the second insulating element.

20 Claims, 13 Drawing Sheets

(56) References Cited

U.S. PATENT DOCUMENTS

| | | | |
|---|---|---|---|
| 9,335,370 B2 | 5/2016 | Atwood et al. | |
| 12,036,875 B2* | 7/2024 | Ham | G01R 27/025 |
| 2012/0153964 A1 | 6/2012 | Chen et al. | |
| 2017/0059658 A1* | 3/2017 | Tanaka | H02J 7/0068 |
| 2024/0353466 A1* | 10/2024 | Yoon | G01R 31/52 |

OTHER PUBLICATIONS

Bonifield, T., "High-voltage isolation quality and reliability for AMC130x", Jun. 2016, SSZY024, Texas Instruments Incorporated, Dallas, Texas, 6 pages.

R. Yun et al.: "A Transformer-based Digital Isolator with 20kVPK Surge Capability and > 200kV/µS Common Mode Transient Immunity," 2016 Symposium on VLSI Circuits Digest of Technical Papers, pp. 1-2.

Notice of Refusal (Office Action) mailed Dec. 24, 2024 in Japanese Patent Application No. 2022-049090, with English translation, 5 pages.

Decision to Grant a Patent mailed Apr. 1, 2025 in corresponding Japanese Patent Application No. 2022-049090, 3 pages (with English machine translation).

\* cited by examiner

US 12,348,254 B2

DETECTION CIRCUIT AND COMMUNICATION SYSTEM

CROSS-REFERENCE TO RELATED APPLICATIONS

This application is based upon and claims the benefit of priority from Japanese Patent Application No. 2022-049090, filed on Mar. 24, 2022; the entire contents of which are incorporated herein by reference.

FIELD

Embodiments described herein relate generally to a detection circuit and a communication system.

BACKGROUND

An insulating state of an insulating element of which a primary side and a secondary side are insulated from each other may deteriorate due to a deterioration over time or the like.

DETAILED DESCRIPTION

In general, according to one embodiment, there is provided a detection circuit including a first insulating element, a second insulating element, a first transmission test circuit, a second transmission test circuit, and a reception test circuit. The first transmission test circuit is connected to the first insulating element. The second transmission test circuit is connected to the second insulating element. The reception test circuit is connected to each of the first insulating element and the second insulating element to output a detection signal corresponding to a difference between a voltage of the first insulating element and a voltage of the second insulating element.

Exemplary embodiments of a communication system will be explained below in detail with reference to the accompanying drawings. The present invention is not limited to the following embodiments.

Embodiment

A detection circuit according to an embodiment has been devised to detect a deterioration of an insulating element as a sign of an insulation failure. The term "deterioration" of the insulating element in insulation refers to a state in which the insulation performance deteriorates on a primary side and a secondary side. The term "insulation fault" means a sign of an insulation failure in a state before the insulating element reaches an insulation failure (e.g., short circuit fault).

Figure 1:
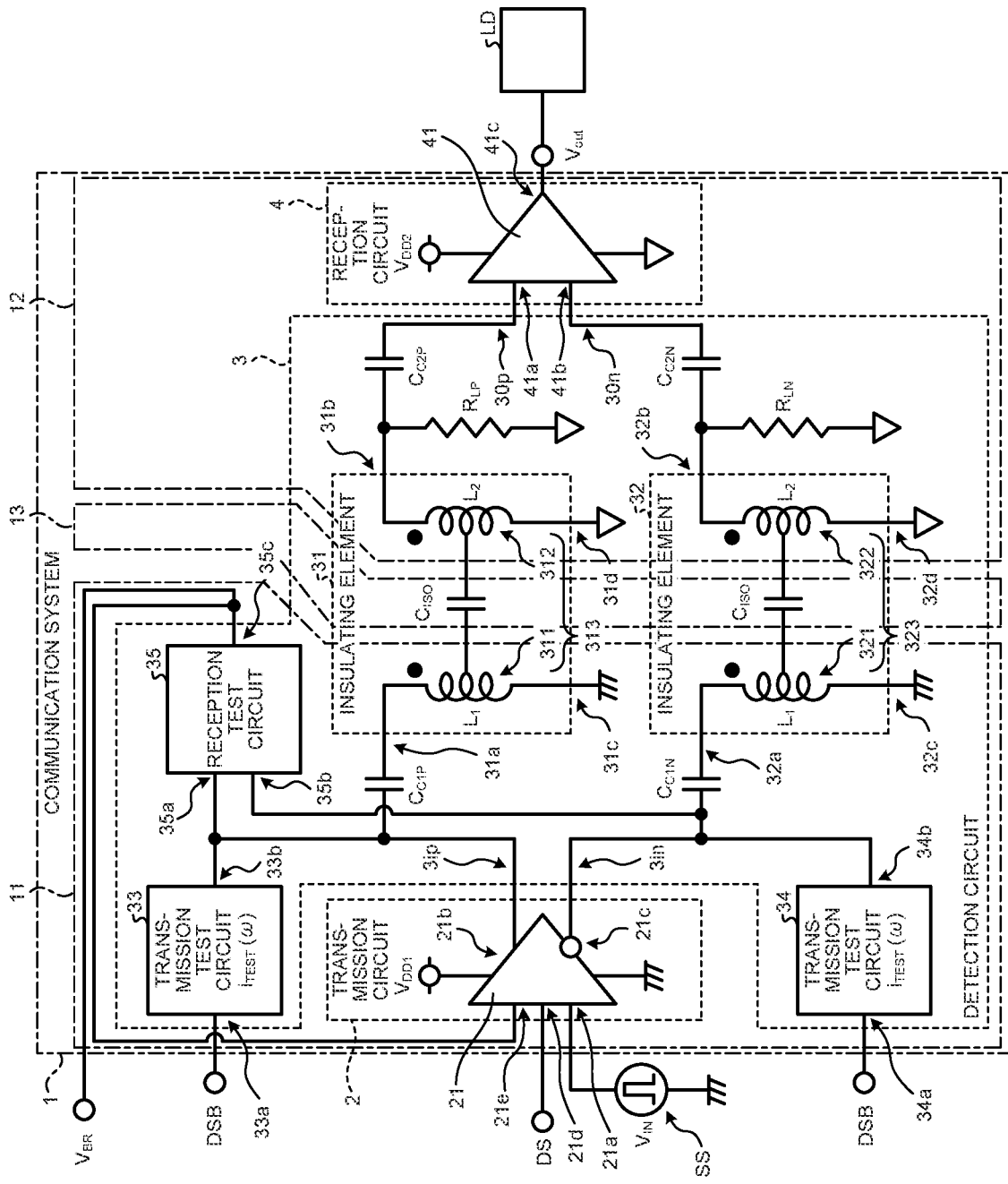
FIG. 1 is a circuit diagram illustrating a configuration of a communication system including a detection circuit according to an embodiment.

As illustrated in FIG. 1, a communication system 1 including the detection circuit 3 includes insulating elements 31 and 32. Each of the insulating elements 31 and 32 includes a galvanic insulating element that insulates a ground potential and transmits a signal. For example, each of the insulating elements 31 and 32 is an insulating transformer. The communication system 1 detects a deterioration of the galvanic insulating element in insulation. When the deterioration in insulation is detected, the communication system 1 stops the signal transmission, and at the same time, issues a detection signal indicating that the insulation deterioration has been detected to a user.

The galvanic insulating element may be either an insulating transformer (magnetic field coupling) or an insulating capacitor (electric field coupling). In addition, two insulating elements may be provided on each chip in a double insulation manner, or one insulating element may be provided on either substrate in a single insulation manner. Alternatively, each chip having no insulating element may be connected to a dedicated substrate having an insulating element. Furthermore, an insulating layer may be any of a silicon oxide film, a silicon nitride film, and a polyimide film, or other insulating films likes.

In a case where a high-voltage device and a low-voltage device are connected to each other, a galvanic insulating element is used to avoid wraparound of noise and electric shock. The galvanic insulating element is an element that transmits an electric signal while securing input and output electrical insulation. As a medium used to transmit the signal, light, an electric field, or a magnetic field is often selected.

Before describing the embodiment, an insulation deterioration mode of an insulating element considered to be detected in the present embodiment will be described. First, it is assumed that a leakage current flows through the insulating element due to the deterioration of the insulating element in insulation. In other words, the deterioration state according to the lapse of time means that the insulating element is similar to a model in which a capacitor ($C_{iso}$) and a resistor ($R_{Leak}$) are equivalently parallel with each other. In addition, it is assumed in the present system that differential signals are transmitted to the insulating elements. Therefore, two transformers are used in a case where the insulating elements are insulating transformers, and two capacitors are used in a case where the insulating elements are insulating capacitors. Since the deterioration of the insulating element over time progresses from a point where a defect exists, it is unlikely that the two insulating elements deteriorate "concurrently". Furthermore, the deterioration of the insulating element progresses slowly, and thus, it is less likely that the insulating element deteriorates rapidly at the same time interval (e.g., several nanoseconds or less) as the transmission of the signal.

Therefore, in the communication system 1, the plural insulating elements 31 and 32 are configured as a differential transmission system, and the insulating element 31 and the insulating element 32 constitute a differential pair. As illustrated in FIG. 1, the detection circuit 3 is configured to detect a deterioration in the plural insulating elements 31 and 32 based on a difference in characteristics therebetween. For example, the communication system 1 including the detection circuit 3 can be configured as illustrated in FIG. 1. FIG. 1 is a circuit diagram illustrating a configuration of the communication system 1 including the detection circuit 3.

The communication system 1 includes a transmission circuit 2, a reception circuit 4, and a detection circuit 3. The transmission circuit 2 is disposed between a signal source SS and the detection circuit 3. The communication system 1 may be implemented to include a transmission-side region 11, an insulating layer 13, and a reception-side region 12. In this case, a transmission circuit 2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 11. A secondary-side portion (an inductive element 312) of the insulating element 31, a secondary-side portion (an inductive element 322) of the insulating element 32, and a reception circuit 4 are mounted on the reception-side The transmission-side region 11 and the reception-side region 12 are insulated from each other via the insulating layer 13. The primary-side portion of the insulating element 31 and the secondary-side portion of the insulating element 31 are insulated from each other via the insulating layer 13. The primary-side portion of the insulating element 32 and the secondary-side portion of the insulating element 32 are insulated from each other via the insulating layer 13. The insulating layer 13 may be any of a silicon oxide film, a silicon nitride film, and a polyimide film or likes.

The transmission circuit 2 includes a differential driver circuit 21. The differential driver circuit 21 is, for example, in a single-phase input/differential output type, and has an input node 21a electrically connected to an output node of the signal source SS, a positive-phase output node 21b electrically connected to a P-side input node Sip of the detection circuit 3, and a negative-phase output node 21c electrically connected to an N-side input node Sin of the detection circuit 3.

An input node 21d of the differential driver circuit 21 receives a disable signal DS from the outside (e.g., a higher-level controller), and the input node 21a of the differential driver circuit 21 receives a signal $V_{IN}$ from the signal source SS. When the disable signal DS is at a non-active level (e.g., an L level), the differential driver circuit 21 generates differential signals $V_{D+}$ and $V_{D-}$ corresponding to the signal $V_{IN}$ received from the signal source SS, and outputs the generated differential signals $V_{D+}$ and $V_{D-}$ to the insulating elements 31 and 32, respectively. The signal $V_{IN}$ is a radio-frequency signal, and each of the differential signals $V_{D+}$ and $V_{D-}$ (not illustrated) is a radio-frequency signal corresponding to the signal $V_{IN}$. When the disable signal DS is at an active level (e.g., an H level), the differential driver 21 is disabled to stop its operation.

An input node 21e of the differential driver circuit 21 receives a detection signal $V_{BR}$ from the reception test circuit 35. When the detection signal $V_{BR}$ is at an active level (e.g., an H level), the differential driver circuit 21 stops its operation regardless of the level of the disable signal DS.

Note that the signal source SS may have a differential configuration. In this case, the differential driver circuit 21 may be a differential amplifier in a differential input/differential output type. The differential driver 21 may have a positive-phase input node electrically connected to a positive-phase output node of the signal source SS and a negative-phase input node electrically connected to a negative-phase output node of the signal source SS.

The reception circuit 4 is disposed between the detection circuit 3 and a load circuit LD. The reception circuit 4 includes a differential receiver circuit 41. The differential receiver circuit 41 is in a differential input/single-phase output type, and has a positive-phase input node 41a electrically connected to a P-side output node 30p of the detection circuit 3, a negative-phase input node 41b electrically connected to an N-side output node 30n of the detection circuit 3, and an output terminal 41c electrically connected to an input node of the load circuit LD. The output node 41c of the differential receiver circuit 41 is connected to the load circuit LD.

The positive-phase input node 41a and the negative-phase input node 41b of the differential receiver circuit 41 receive the differential signals $V_{D+}$ and $V_{D-}$ from the insulating elements 31 and 32, respectively. The differential receiver circuit 41 outputs a signal Vout corresponding to the differential signals $V_{D+}$ and $V_{D-}$ to the load circuit LD.

Note that the load circuit LD may have a differential configuration. In this case, the differential receiver circuit 41 may be a differential amplifier in a differential input/differential output type. The differential receiver 41 may have a positive-phase output terminal electrically connected to a P-side input node of the load circuit LD and a negative-phase output terminal electrically connected to an N-side input node of the load circuit LD.

The detection circuit 3 is connected between the transmission circuit 2 and the reception circuit 4. The detection circuit 3 includes an insulating element (a first insulating element) 31, an insulating element (a second insulating element) 32, a transmission test circuit (a first transmission test circuit) 33, a transmission test circuit (a second transmission test circuit) 34, a reception test circuit 35, a capacitive element $C_{C1P}$, a capacitive element $C_{C2P}$, a capacitive element $C_{C1N}$, a capacitive element $C_{C2N}$, a resistive element $R_{LP}$, and a resistive element $R_{LN}$.

The primary side and the secondary side of the insulating element 31 are electrically insulated from each other. The insulating element 31 has an input node 31a and a ground node 31c on the primary side, and has an output node 31b and a ground node 31d on the secondary side. The input node 31a and the output node 31b are electrically insulated from each other. The ground node 31c and the ground node 31d are electrically insulated from each other, although each has a ground potential.

For example, the insulating element 31 is a galvanic insulating element that insulates the ground potential and transmits a radio-frequency signal. The insulating element 31 includes an insulating transformer 313. The insulating transformer 313 includes an inductive element 311 and an inductive element 312. The inductive element 311 has one end connected to the input node 31a and the other end connected to the ground node 31c. The inductive element 312 has one end connected to the output node 31b and the other end connected to the ground node 31d.

In the insulating transformer 313, the inductive element 311 and the inductive element 312 are electrically insulated from each other and magnetically coupled to each other. A parasitic capacitor $C_{ISO}$ exists between the inductive element 311 and the inductive element 312. A wound direction of the inductive element 311 and a wound direction of the inductive element 312 have a relationship such that when a current flows from the input node 31a to • of the inductive element 311, the current flows from • of the inductive element 312 to the output node 31b. Note that the inductive element 311 and the inductive element 321 may be coupled to each other in such a manner that they are wound in opposite directions with respect to the current path, and connected to the same ground node. In this case, it is preferable that the inductive element 311 and the inductive element 312 are wound in the same direction with respect to the current path.

The primary side and the secondary side of the insulating element 32 are electrically insulated from each other. The insulating element 32 has an input node 32a and a ground node 32c on the primary side, and has an output node 32b and a ground node 32d on the secondary side. The input node 32a and the output node 32b are electrically insulated from each other. The ground node 32c and the ground node 32d are electrically insulated from each other, although each has a ground potential.

For example, the insulating element 32 includes a galvanic insulating element that insulates the ground potential and transmits a radio-frequency signal. The insulating element 32 includes an insulating transformer 323. The insulating transformer 323 includes an inductive element 321 and an inductive element 322. The inductive element 321 has one end connected to the input node 32a and the other end connected to the ground node 32c. The inductive element 322 has one end connected to the output node 32b and the other end connected to the ground node 32d.

In the insulating transformer 323, the inductive element 321 and the inductive element 322 are electrically insulated from each other and magnetically coupled to each other. A parasitic capacitor $C_{ISO}$ exists between the inductive element 321 and the inductive element 322. A wound direction of the inductive element 321 and a wound direction of the inductive element 322 have a relationship such that when a current flows from the input node 32a to • of the inductive element 321, the current flows from • of the inductive element 322 to the output node 32b.

An input node 33a of the transmission test circuit 33 receives an inverted disable signal DSB from the outside (e.g., a higher-level controller). The inverted disable signal DSB is a signal obtained by logically inverting the disable signal DS, and is an L-active signal. An output node 33b of the transmission test circuit 33 is connected to the primary side of the insulating element 31 via the capacitive element $C_{C1P}$. The output node 33b of the transmission test circuit 33 is electrically connected to one end of the inductive element 311 via the capacitive element $C_{C1P}$. The transmission test circuit 33 can generate a test signal $i_{TEST}(\omega)$. The test signal $i_{TEST}(\omega)$ is a radio-frequency signal.

When the inverted disable signal DSB is at an active level (e.g., an L level), the transmission test circuit 33 generates a test signal $i_{TEST}(\omega)$ and outputs the generated test signal $i_{TEST}(\omega)$ to the insulating element 31. When the inverted disable signal DSB is at a non-active level (e.g., an H level), the transmission test circuit 33 is disabled to stop its operation.

An input node 34a of the transmission test circuit 34 receives an inverted disable signal DSB from the outside (e.g., a higher-level controller). The inverted disable signal DSB is a signal obtained by logically inverting the disable signal DS, and is an L-active signal. An output node 34b of the transmission test circuit 34 is connected to the primary side of the insulating element 32 via the capacitive element $C_{C1N}$. The output node 34b of the transmission test circuit 34 is electrically connected to one end of the inductive element 321 via the capacitive element $C_{C1N}$. The transmission test circuit 34 can generate a test signal $i_{TEST}(\omega)$. The test signal $i_{TEST}(\omega)$ is a radio-frequency signal.

When the inverted disable signal DSB is at an active level (e.g., an L level), the transmission test circuit 34 generates a test signal $i_{TEST}(\omega)$ and outputs the generated test signal $i_{TEST}(\omega)$ to the insulating element 32. When the inverted disable signal DSB is at a non-active level (e.g., an H level), the transmission test circuit 34 is disabled to stop its operation.

The reception test circuit 35 has an input node 35a connected to the primary side of the insulating element 31 via the capacitive element $C_{C1P}$, an input node 35b connected to the primary side of the insulating element 32 via the capacitive element $C_{C1N}$, and an output node 35c connected to the outside (e.g., a subsequent circuit) and the differential driver circuit 21 of the transmission circuit 2. The input node 35a of the reception test circuit 35 is electrically connected to one end of the inductive element 311 via the capacitive element $C_{C1P}$, and the input node 35b of the reception test circuit 35 is electrically connected to one end of the inductive element 321 via the capacitive element $C_{C1N}$.

The reception test circuit 35 outputs a detection signal $V_{BR}$ corresponding to a difference between a voltage of the insulating element 31 and a voltage of the insulating element 32. When the difference between the voltage of the insulating element 31 and the voltage of the insulating element 32 is equal to or smaller than a threshold, the reception test circuit 35 outputs the detection signal $V_{BR}$ at a non-active level (e.g., an L level). When the difference between the voltage of the insulating element 31 and the voltage of the insulating element 32 is larger than the threshold, the reception test circuit 35 outputs the detection signal $V_{BR}$ at an active level (e.g., an H level). The detection signal $V_{BR}$ at the non-active level indicates that insulation fault (i.e., a sign of insulation failure) has not been detected. The detection signal $V_{BR}$ at the active level indicates that insulation fault (i.e., a sign of an insulation failure) has been detected.

When a detection signal $V_{BR}$ at a non-active level is received, the differential driver 21 of the transmission circuit 2 performs a signal transmission operation if the disable signal DS is at a non-active level, and stops the signal transmission operation if the disable signal DS is at an active level.

When the input node 21e receives a detection signal $V_{BR}$ at an active level, the differential driver 21 of the transmission circuit 2 stops the signal transmission operation regardless of the level of the disable signal DS.

The capacitive element $C_{C1P}$ is connected between 'the transmission circuit 2, the transmission test circuit 33 and the reception test circuit 35' and 'the insulating element 31'. The capacitive element $C_{C1P}$ has one end connected to the output node 21b of the differential driver circuit 21, the output node 33b of the transmission test circuit 33, and the input node 35a of the reception test circuit 35, and the other end connected to the input node 31a of the insulating element 31.

The capacitive element $C_{C2P}$ is connected between 'the insulating element 31, and the resistive element $R_{LP}$' and 'the reception circuit 4'. The capacitive element $C_{C2P}$ has one end connected to the output node 31b of the insulating element 31 and one end of the resistive element $R_{LP}$, and the other end connected to the input node 41a of the differential receiver circuit 41.

The capacitive element $C_{C1N}$ is connected between 'the transmission circuit 2, the transmission test circuit 34 and the reception test circuit 35' and 'the insulating element 32'. The capacitive element $C_{C1N}$ has one end connected to the output node 21c of the differential driver circuit 21, the output node 34b of the transmission test circuit 34, and the input node 35b of the reception test circuit 35, and the other end connected to the input node 32a of the insulating element 32.

The capacitive element $C_{C1N}$ is connected between 'the insulating element 32 and the resistive element $R_{LN}$' and 'the reception circuit 4'. The capacitive element $C_{C2N}$ has one end connected to the output node 32b of the insulating element 32 and one end of the resistive element $R_{LN}$, and the other end connected to the input node 41b of the differential receiver circuit 41.

The resistive element $R_{LP}$ is connected between the insulating element 31 and the capacitive element $C_{C2P}$. The resistive element $R_{LP}$ has one end connected to a line connecting the output node 31b of the insulating element 31 and one end of the capacitive element $C_{C2P}$ to each other, and the other end connected to the ground potential.

The resistive element $R_{LN}$ is connected between the insulating element 32 and the capacitive element $C_{C2N}$. The resistive element $R_{LN}$ has one end connected to a line connecting the output node 32b of the insulating element 32 and one end of the capacitive element $C_{C1N}$ to each other, and the other end connected to the ground potential.

In the communication system 1, the detection circuit 3 can detect a deterioration of the insulating element 31 or 32 with high accuracy.

When the disable signal DS is at the L level, the communication system 1 operates in a normal mode. In the normal mode, the transmission test circuits 33 and 34 are disabled, and the transmission circuit 2 is enabled. In the normal mode, communication is performed via the insulating elements 31 and 32 (insulating transformers 313 and 314). An input signal can be differentiated by the transmission circuit 2, differential signals can be transmitted through the insulating elements 31 and 32, and the signals can be detected by the differential reception circuit 4.

When the disable signal DS is at the H level, the communication system 1 operates in a test mode. In the test mode, the transmission test circuits 33 and 34 are enabled, and the transmission circuit 2 is disabled. In the test mode, the same test signal (e.g., a sine wave) $i_{TEST}(\omega)$ is applied from the transmission test circuit 33 and the transmission test circuit 34 to the insulating element 31 and the insulating element 32, respectively. The test signal $i_{TEST}(\omega)$ of the transmission test circuit 33 and the test signal $i_{TEST}(\omega)$ of the transmission test circuit 34 may be signals having substantially the same frequency and phase.

In a case where a deterioration has not occurred in the insulating element 31 or 32, the insulating elements 31 and 32 have substantially the same terminal voltage, and accordingly, a differential voltage input to the reception test circuit 35 is about 0 V.

On the other hand, in a case where a deterioration of the insulating element 31 or 32 has progressed over time, the deterioration has progressed over time from a weakest point, and accordingly, the insulating element 31 and the insulating element 32 become different in input impedance. Therefore, when test signals $i_{TEST}(\omega)$ having the same frequency and the same amplitude are input from the transmission test circuit 33 and the transmission test circuit 34, a differential voltage input to the reception test circuit 35 occurs.

When the differential voltage larger than the threshold is input to the reception test circuit 35, the reception test circuit 35 determines that the insulating element 31 or the insulating element 32 has deteriorated over time, and issues a detection signal $V_{BR}$. When the detection signal $V_{BR}$ is issued, the transmission circuit 2 is forcibly controlled to stop the signal transmission, and output a detection signal $V_{BR}$ at an issue level (e.g., an H level) to the outside (e.g., a subsequent circuit). As a result, it is possible to notify the user of the deterioration of the device over time.

Note that the reception test circuit 35 may have either two single-phase inputs or one differential input. In a case where the reception test circuit 35 has two single-phase inputs, the two single-phase inputs can be discriminated from each other by comparing single-phase signals in maximum value, average value, effective value, or the like. In a case where one differential signal is input to the reception test circuit 35, comparison is simple, but it is preferable that two signals transmitted from the transmission test circuit 33 and the transmission test circuit 34 have the same phase.

Figure 2:
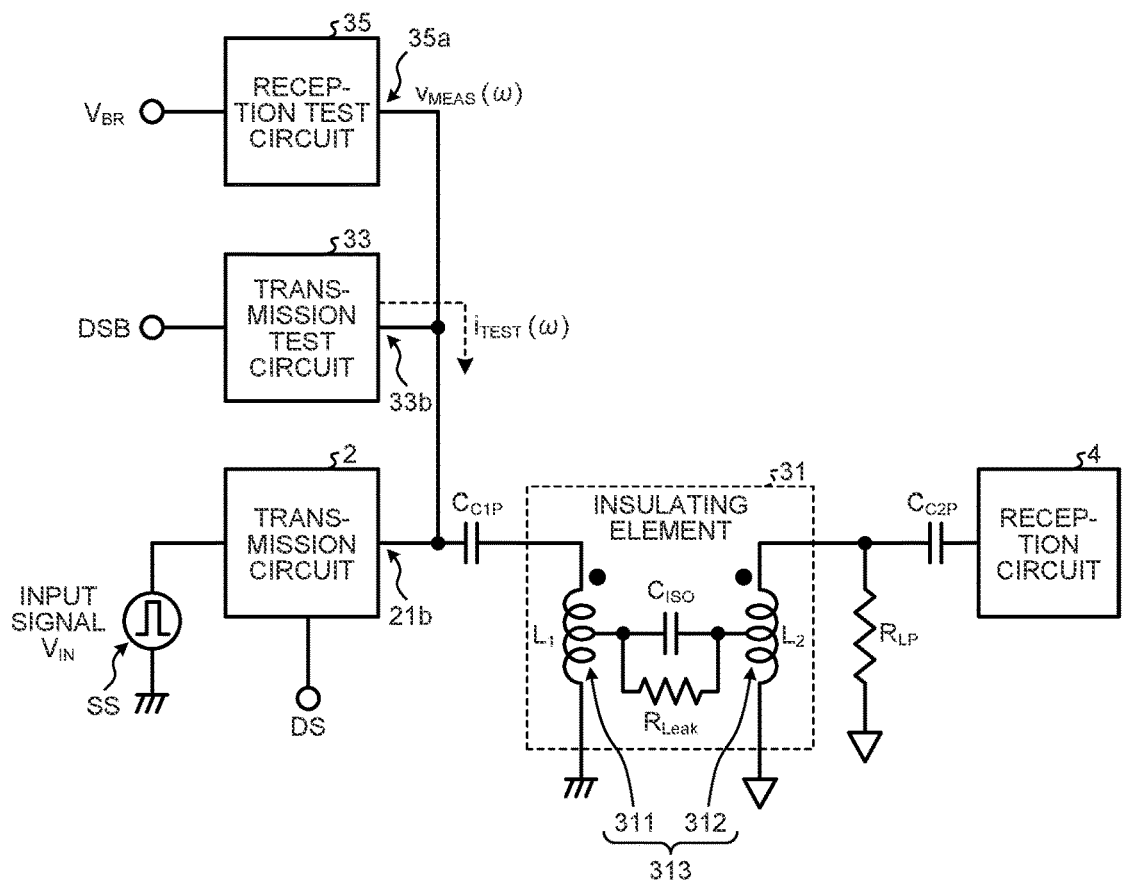
FIG. 2 is a circuit diagram illustrating a mechanism for detecting an abnormality in the embodiment.

Now, a mechanism for detecting insulation fault according to the embodiment will be described in detail. A mechanism for detecting insulation fault in the insulating transformer 313 or 323 will be described with reference to FIG. 2. FIG. 2 is a diagram obtained by extracting a P-side portion of FIG. 1.

When the disable signal DS is at the H level, it is preferable that the transmission circuit 2 is in a disable operation state and the transmission circuit 2 outputs Hi-Z (a high impedance). In this state, when a test signal $i_{TEST}(\omega)$ is output from the transmission test circuit 33, most of the test signal $i_{TEST}(\omega)$ flows to the insulating transformer 313 rather than flowing to the output terminal of the transmission circuit 2. An input impedance ($Z_{IN}$) of the insulating transformer 313 is determined according to an inductance value $L_1$ of the inductive element 311, an inductance $L_2$ of the inductive element 312, a coupling coefficient k between the inductive element 311 and the inductive element 312, a parasitic capacitor $C_{ISO}$ between the inductive element 311 and the inductive element 312, a resistance value $R_{LP}$ of the resistive element $R_{LP}$, and a resistance value $R_{Leak}$ of an insulation leak path between the inductive element 311 and the inductive element 312.

The input impedance $Z_{IN}$ of the insulating transformer 313 has a maximum value $\omega_0$. For example, $\omega_0$ is a resonance frequency of a loop including the inductive element 311, the parasitic capacitor $C_{ISO}$, and the inductive element 312. When the deterioration of the insulating transformer 313 in insulation progresses, it can be considered that the resistor $R_{Leak}$ of the insulation leak path is equivalently connected in parallel with the parasitic capacitor $C_{ISO}$ between the inductive elements 311 and 312. When the frequency ω of the test signal $i_{TEST}(\omega)$ is set to $\omega_0$, a change in resistance value $R_{Leak}$ of the insulation leak path can be detected as a change in voltage $v_{MEAS\,(\omega)}$ of the insulating transformer 313 with high sensitivity.

Figure 3:
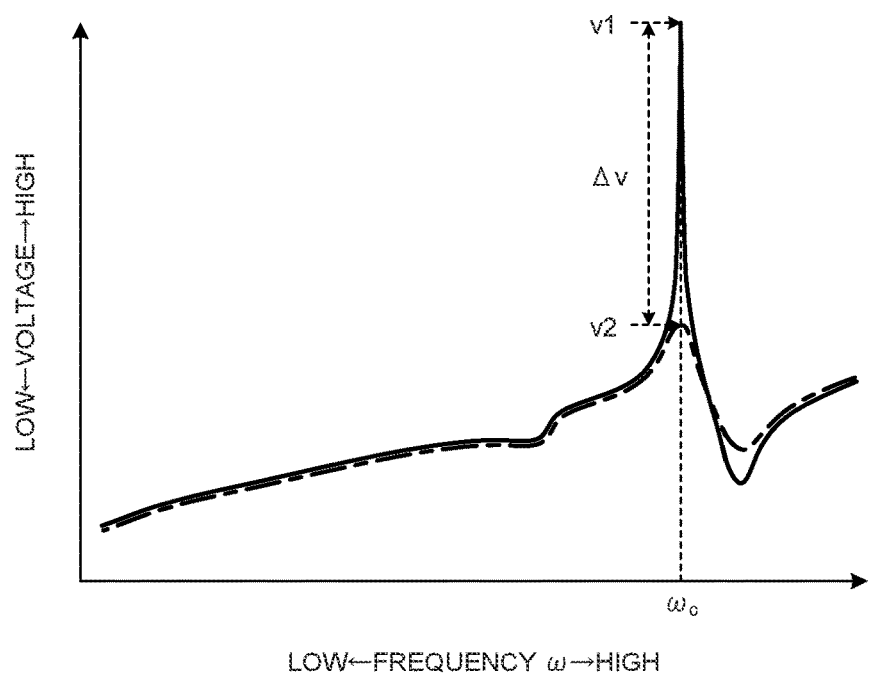
FIG. 3 is a diagram illustrating a difference in voltage of an insulating element depending on whether or not the insulating element deteriorates in the embodiment.

FIG. 3 illustrates an example of a voltage $v_{MEAS\,(\omega)}$ of the insulating transformer 313 when the test signal $i_{TEST}(\omega)$ is input. A solid line indicates a case where a deterioration over time has not occurred in the insulating element 31 or 32, and an alternate long and short dash line indicates a case where a deterioration over time has occurred in the insulating element 31 or 32 and the insulation leak path has a resistance value $R_{Leak}$ of 1 kΩ. As can be seen from FIG. 3, when a deterioration has not occurred over time in the insulating element 31 or 32, an impedance input to the insulating element becomes high and the insulating element has a high voltage $v_{MEAS}(\omega_0)$ of v1 for resonance at a frequency ω of $\omega_0$. On the other hand, when a deterioration has occurred over time and the insulation leak path has a resistance value $R_{Leak}$ of 1 kΩ, a Q value decreases, and a voltage $v_{MEAS}(\omega_0)$ is measured as v2, which is a small value. In the example of FIG. 3, it is illustrated that by, setting the frequency ω of the test signal $i_{TEST}(\omega)$ to $\omega_0$, it is possible to ensure a great voltage difference Δv between the voltage v1 when there is no deterioration and the voltage v2 when there is a deterioration. The voltage difference Δv corresponds to, for example, an impedance change of 100 times (40 dB) with respect to a short circuit mode of 1 kΩ. The threshold used in the reception test circuit 35 can be determined depending on the voltage difference Δv. For example, the threshold may be determined as $\Delta v \times \alpha (0 < \alpha \le 1)$.

In the differential signal transmission system of FIG. 1, in a case where the insulating element 31 and the insulating element 32 are tested using the test signal $i_{TEST}(\omega)$ whose frequency ω is $\omega_0$, it can be seen that a large differential voltage is input to the reception test circuit 35 when a deterioration has occurred over time in any one of the insulating elements 31 and 32. As a result, a deterioration in insulation of the insulating element according to the lapse of time or the like can be detected with high sensitivity, and insulation fault (i.e., a sign of an insulation failure) of the insulating element can be detected.

The load impedance of the insulating transformer 313 may not be a resistance of the resistive element $R_{LP}$, and the load impedance of the insulating transformer 323 may not be a resistance of the resistive element $R_{LN}$. The coupling capacitors (the capacitive elements $C_{C1P}$ and $C_{C1N}$) and the coupling capacitors (the capacitive elements $C_{C2P}$ and $C_{C2N}$) may be omitted.

As described above, in the detection circuit 3 of the communication system 1 according to the embodiment, substantially the same test signal is transmitted from the two transmission test circuits 33 and 34 to the two insulating elements 31 and 32, and the reception test circuit 35 outputs a detection signal corresponding to a difference in voltage between the two insulating elements 31 and 32. The reception test circuit 35 outputs a detection signal (e.g., an L-level detection signal) indicating that a deterioration has not occurred when the difference in voltage between the two insulating elements 31 and 32 is equal to or smaller than a threshold, and outputs a detection signal (e.g., an H-level detection signal) indicating that a deterioration has occurred when the difference in voltage between the two insulating elements 31 and 32 is larger than the threshold. As a result, it is possible to detect a deterioration of the insulating element as insulation fault (i.e., a sign of an insulation failure) with high accuracy. In a case where the insulating elements 31 and 32 are insulating transformers 313 and 323, a deterioration of the insulating element 31 or 32 can be detected with high sensitivity by using a resonance phenomenon.

For example, in a case where the primary side and the secondary side are optically coupled to each other by a photocoupler in the insulating element, the photocoupler can ensure electrical insulation therebetween using a molding resin between a light emitting element (e.g., a light emitting diode) and a light receiving element (e.g., a photodiode). In a case where the resin undergoes a dielectric breakdown, heat generated by the breakdown does not cause the explosion of the resin that results in a breakdown mode in which the primary side and the secondary side are electrically connected to each other. Therefore, the insulation function is highly reliable.

However, in a case where plural signals are transmitted, the cost tends to increase because photocouplers are used as many as the number of signals. Further, in a case where plural light emitting elements and plural light receiving elements are mounted in one package, the reliability tends to decrease and the cost tends to increase because a problem of crosstalk occurs and assembly becomes complicated.

In contrast, in the present embodiment, the insulating elements 31 and 32 use a magnetic field as a signal transmission medium. The detection circuit uses a configuration in which the primary side and the secondary side are magnetically coupled to each other by the insulating elements 31 and 32. When the magnetic field is used as a transmission medium, insulating transformers 313 and 323 are used by forming coils at both ends of the insulating layer. The insulating transformers may use an insulating layer of a polyimide layer on the chip or a wiring layer of the chip. In either case, the insulating layer has a thickness of about 10 to 30 μm, which is one digit thinner than an insulation interval (400 μm or more) between the photocouplers by the mold resin. For this reason, insulation fault such as a short circuit fault is likely to occur.

In contrast, it may be considered that insulating elements are cascade-connected to each other to form an insulating layer in a double insulation type. This configuration makes it possible to improve a withstand voltage, but is not a fundamental solution to the problem because the insulating layer is still thinner than the insulation interval between the photocouplers. Therefore, as in the present embodiment, it is effective to detect a deterioration of the insulating element 31 or 32 as a sign before the insulation fault occurs.

Although not illustrated, in the detection circuit 3, plural insulating elements 31 may be cascade-connected to each other in series between the primary side and the secondary side, and plural insulating elements 32 may be cascade-connected to each other in series between the primary side and the secondary side. As a result, it is possible to improve the withstand voltage.

Each of the transmission test circuit 33 and the transmission test circuit 34 may receive a test signal $i_{TEST}(\omega)$ from the outside (e.g., a higher-level controller). In this case, it is possible to omit a configuration for generating the test signal $i_{TEST}(\omega)$ from each of the transmission test circuit 33 and the transmission test circuit 34, simplifying an overall configuration of each of the transmission test circuit 33 and the transmission test circuit 34.

At least one of the disable signal DS received by the transmission circuit 2 and the inverted disable signal DSB received by each of the transmission test circuit 33 and the transmission test circuit 34 may be input from the outside (e.g., a higher-level controller).

Figure 4:
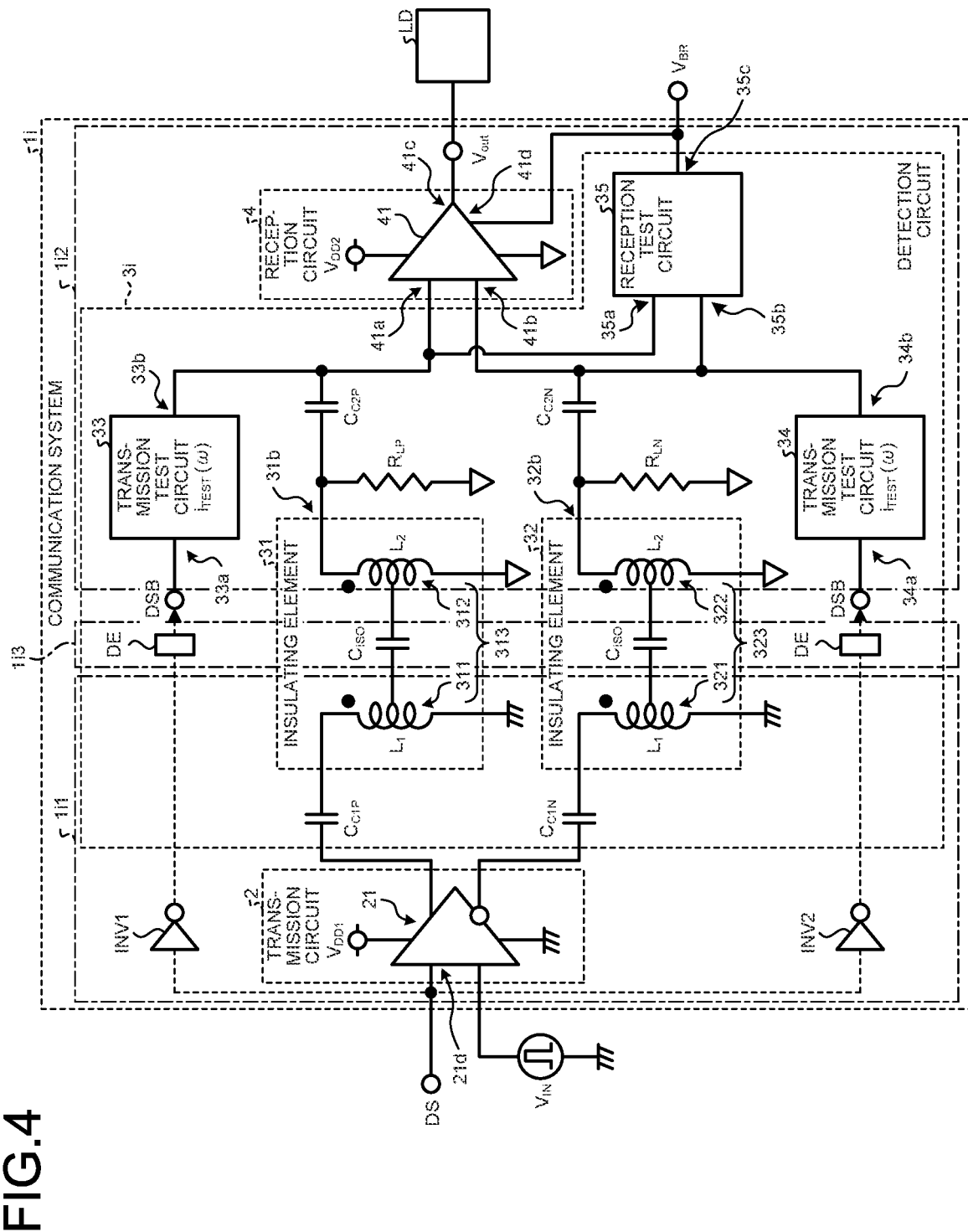
FIG. 4 is a diagram illustrating a configuration of a communication system including a detection circuit according to a first modification of the embodiment.

Furthermore, as a first modification of the embodiment, a communication system 1*i* may be configured as illustrated in FIG. 4. FIG. 4 is a diagram illustrating a configuration of a communication system 1*i* including a detection circuit 3*i* according to the first modification of the embodiment.

The communication system 1*i* includes a detection circuit 3*i* instead of the detection circuit 3 (see FIG. 1). In the detection circuit 3*i*, the transmission test circuit 33, the transmission test circuit 34, and the reception test circuit 35 are disposed on the reception circuit 4 side. The communication system 1*i* may be implemented to include a transmission-side region 1*i*1, an insulating layer 1*i*3, and a reception-side region 1*i*2. In this case, a transmission circuit 2, an inverter INV1, an inverter INV2, insulating elements DE, a primary-side portion (an inductive element 311) of an insulating element 31, and a primary-side portion (an inductive element 321) of an insulating element 32 are mounted on the transmission-side region 1*i*1. A secondary-side portion (an inductive element 312) of the insulating element 31, a secondary-side portion (an inductive element 322) of the insulating element 32, transmission test circuits 33 and 34, a reception test circuit 35, and a reception circuit 4 are mounted on the reception-side region 1*i*2. The transmission-side region 1*i*1 and the reception-side region 1*i*2 are insulated from each other via the insulating layer 1*i*3. The primary-side portion of the insulating element 31 and the secondary-side portion of the insulating element 31 are insulated from each other via the insulating layer 1*i*3. The primary-side portion of the insulating element 32 and the secondary-side portion of the insulating element 32 are insulated from each other via the insulating layer 1*i*3. The insulating layer 1*i*3 may be any of a silicon oxide film, a silicon nitride film, and a polyimide film or likes.

The output node 33*b* of the transmission test circuit 33 is connected to the input node 41*a* of the differential receiver circuit 41 of the reception circuit 4, and is connected to the secondary side of the insulating element 31 via the capacitive element $C_{C2P}$.

The output node 34*b* of the transmission test circuit 34 is connected to the input node 41*b* of the differential receiver 41 of the reception circuit 4, and is connected to the secondary side of the insulating element 32 via the capacitive element $C_{C2N}$.

The input node 35*a* of the reception test circuit 35 is connected to the input node 41*a* of the differential receiver circuit 41 of the reception circuit 4, and is connected to the secondary side of the insulating element 31 via the capacitive element $C_{C2P}$. The input node 35*b* is connected to the input node 41*b* of the differential receiver circuit 41 of the reception circuit 4, and is connected to the primary side of the insulating element 32 via the capacitive element $C_{C2N}$. The output node 35*c* is connected to the outside (e.g., a subsequent circuit) and an input node 41*d* of the differential receiver 41 of the reception circuit 4.

The principle of detecting a deterioration of the insulating element 31 or 32 is substantially the same as that in the embodiment. However, when the reception circuit 4 has a large input impedance, the input of the reception circuit 4 may not be controlled.

Similarly to the embodiment, during a test mode operation, the reception test circuit 35 outputs a detection signal $V_{BR}$ at a non-active level when the difference between the voltage of the insulating element 31 and the voltage of the insulating element 32 is equal to or smaller than the threshold, and outputs a detection signal $V_{BR}$ at an active level when the difference between the voltage of the insulating element 31 and the voltage of the insulating element 32 is larger than the threshold.

When receiving the detection signal $V_{BR}$ at the non-active level, the differential receiver circuit 41 of the reception circuit 4 performs a signal output operation. When receiving the detection signal $V_{BR}$ at the active level, the differential receiver circuit 41 of the reception circuit 4 stops the signal output operation. As a result, it is possible to detect insulation fault (i.e., a sign of an insulation failure), thereby preventing an output signal of the reception circuit from being unstable.

In the configuration illustrated in FIG. 4, the inverters INV1 and INV2 and the insulating elements DE may be connected in series between the input node 21*d* of the differential driver circuit 21 and the input nodes 33*a* and 34*a* of the transmission test circuits 33 and 34, respectively. In each of the insulating elements DE, an input side and an output side are electrically insulated from each other, such that a signal can be transmitted from the input side to the output side.

As a result, the disable signal DS of the transmission circuit 2 and the inverted disable signals DSB of the transmission test circuits 33 and 34 can be synchronized, and switching between the normal mode and the test mode can be appropriately performed.

Figure 5:
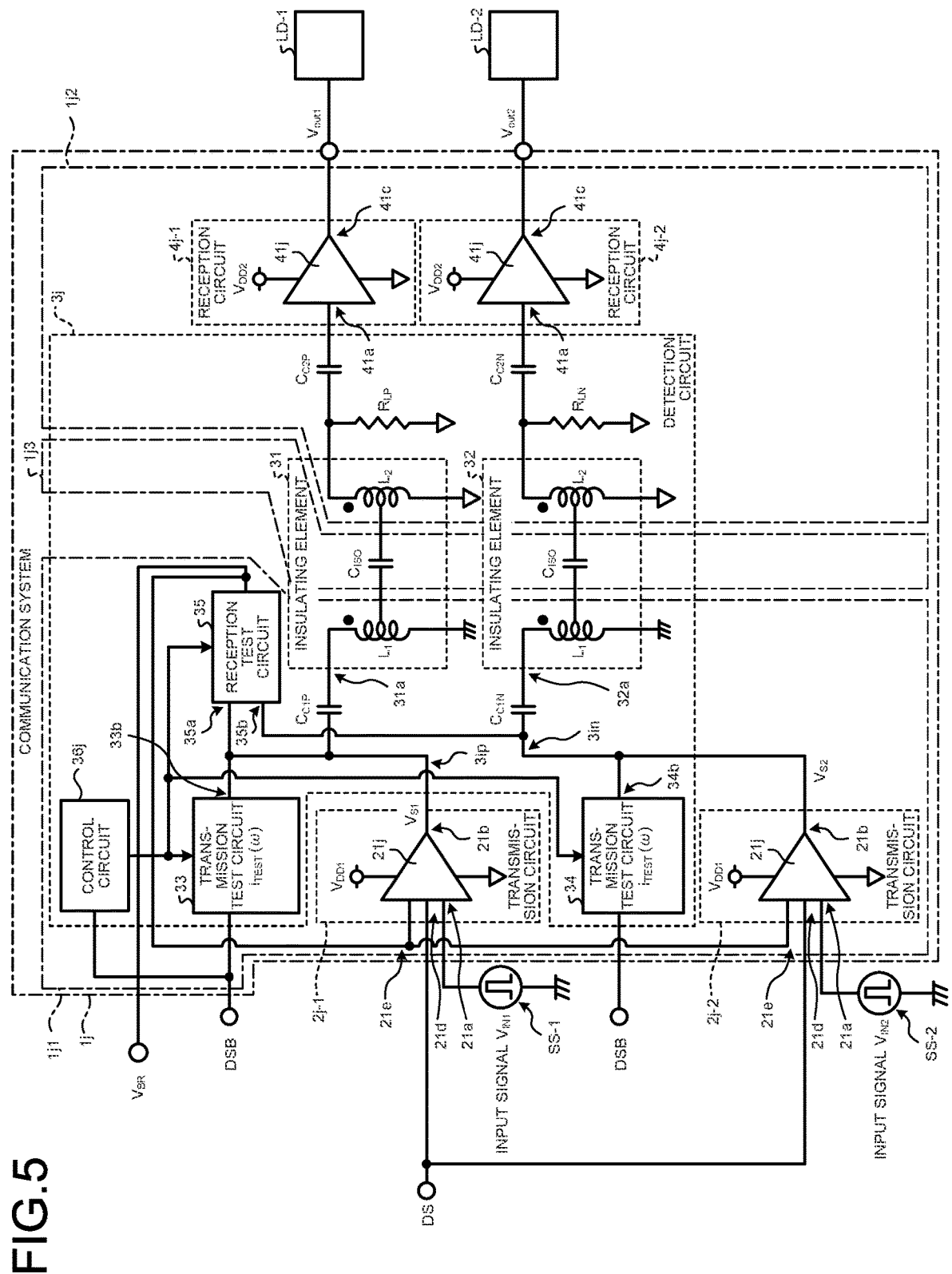
FIG. 5 is a diagram illustrating a configuration of a communication system including a detection circuit according to a second modification of the embodiment.

Furthermore, as a second modification of the embodiment, a communication system 1*j* may be configured as illustrated in FIG. 5. FIG. 5 is a diagram illustrating a configuration of a communication system 1*j* including a detection circuit 3*j* according to the second modification of the embodiment.

In the communication system 1*j*, plural insulating elements 31 and 32 are configured as plural single-phase transmission systems. The communication system 1*j* includes plural transmission circuits 2*j*-1 and 2*j*-2, a detection circuit 3*j*, and plural reception circuits 4*j*-1 and 4*j*-2 instead of the transmission circuit 2, the detection circuit 3, and the reception circuit 4 (see FIG. 1). The communication system 1*j* may be implemented to include a transmission-side region 1*j*1, an insulating layer 1*j*3, and a reception-side region 1*j*2. In this case, transmission circuits 2*j*-1 and 2*j*-2, a control circuit 36*j*, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1*j*1. A secondary-side portion (an inductive element 312) of the insulating element 31, a secondary-side portion (an inductive element 322) of the insulating element 32, and reception circuits 4*j*-1 and 4*j*-2 are mounted on the reception-side region 1*j*2. The transmission-side region 1*j*1 and the reception-side region 1*j*2 are insulated from each other via the insulating layer 1*j*3. The primary-side portion of the insulating element 31 and the secondary-side portion of the insulating element 31 are insulated from each other via the insulating layer 1*j*3. The primary-side portion of the insulating element 32 and the secondary-side portion of the insulating element 32 are insulated from each other via the insulating layer 1*j*3. The insulating layer 1*j*3 may be any of a silicon oxide film, a silicon nitride film, and a polyimide film or likes.

Each transmission circuit 2*j* has a single-phase driver 21*j* in a single-phase input/single-phase output type. The single-phase drivers 21*j* of the transmission circuits 2*j*-1 and 2*j*-2 have input nodes 21*a* electrically connected to output nodes of signal sources SS-1 and SS-2, respectively, and output nodes 21b electrically connected to the insulating elements 31 and 32 via the capacitive elements $C_{C1P}$ and $C_{C1N}$, respectively. Each of the reception circuits 4j-1 and 4j-2 has a single-phase receiver 41j in a single-phase input/single-phase output type. The single-phase receivers 41j of the reception circuits 4j-1 and 4j-2 have input nodes 41a electrically connected to the insulating elements 31 and 32 via the capacitive elements $C_{C2P}$ and $C_{C2N}$, respectively, and output nodes 41c electrically connected to load circuits LD-1 and LD-2, respectively.

As a result, the transmission circuits 2j-1 and 2j-2 transmit single-phase signals $V_{S1}$ and $V_{S2}$, the insulating elements 31 and 32 of the detection circuit 3j transmit the single-phase signals $V_{S1}$ and $V_{S2}$, and the reception circuits 4j-1 and 4j-2 receive the single-phase signals $V_{S1}$ and $V_{S2}$, respectively. That is, the signal transmission is performed in each of the plural single-phase transmission systems.

Meanwhile, in order to detect a deterioration of an insulating element, a difference in characteristic between the two insulating elements is used. The input nodes 31a and 32a of the two insulating elements 31 and 32 are connected to the output nodes 33b and 34b of the two transmission test circuits 33 and 34 via the capacitive elements $C_{C1P}$ and $C_{C1N}$, and are connected to the two input nodes 35a and 35b of the reception test circuit 35. For example, test signals $i_{TEST}(\omega)$ having substantially the same phase and frequency are transmitted from the two transmission test circuits 33 and 34 to the two insulating elements 31 and 32, and the reception test circuit 35 detects a difference in voltage between the insulating elements 31 and 32. Similarly to the embodiment, the reception test circuit 35 outputs a detection signal $V_{BR}$ at a level indicating that insulation fault (i.e., a sign of an insulation failure) has not been detected when the difference in voltage between the insulating elements 31 and 32 is equal to or smaller than the threshold, and outputs a detection signal $V_{BR}$ at a level indicating that insulation fault (i.e., a sign of an insulation failure) has been detected when the difference in voltage between the insulating elements 31 and 32 is larger than the threshold. By taking this configuration, it is possible to detect a deterioration of the insulating element 31 or 32 even in the communication system 1j including plural single-phase transmission systems.

Note that, in a normal mode of the communication system 1j, in a case where one single-phase signal $V_{S1}$ is transmitted, but the other single-phase signal $V_{S2}$ is not transmitted, the transmission circuit 2j-2, the insulating element 32, and the reception circuit 4j-2 may have a dummy configuration. By keeping the transmission circuit 2j-2 in the disabled state, the communication system 1j can be implemented in each of the normal mode and the test mode.

Figure 6:
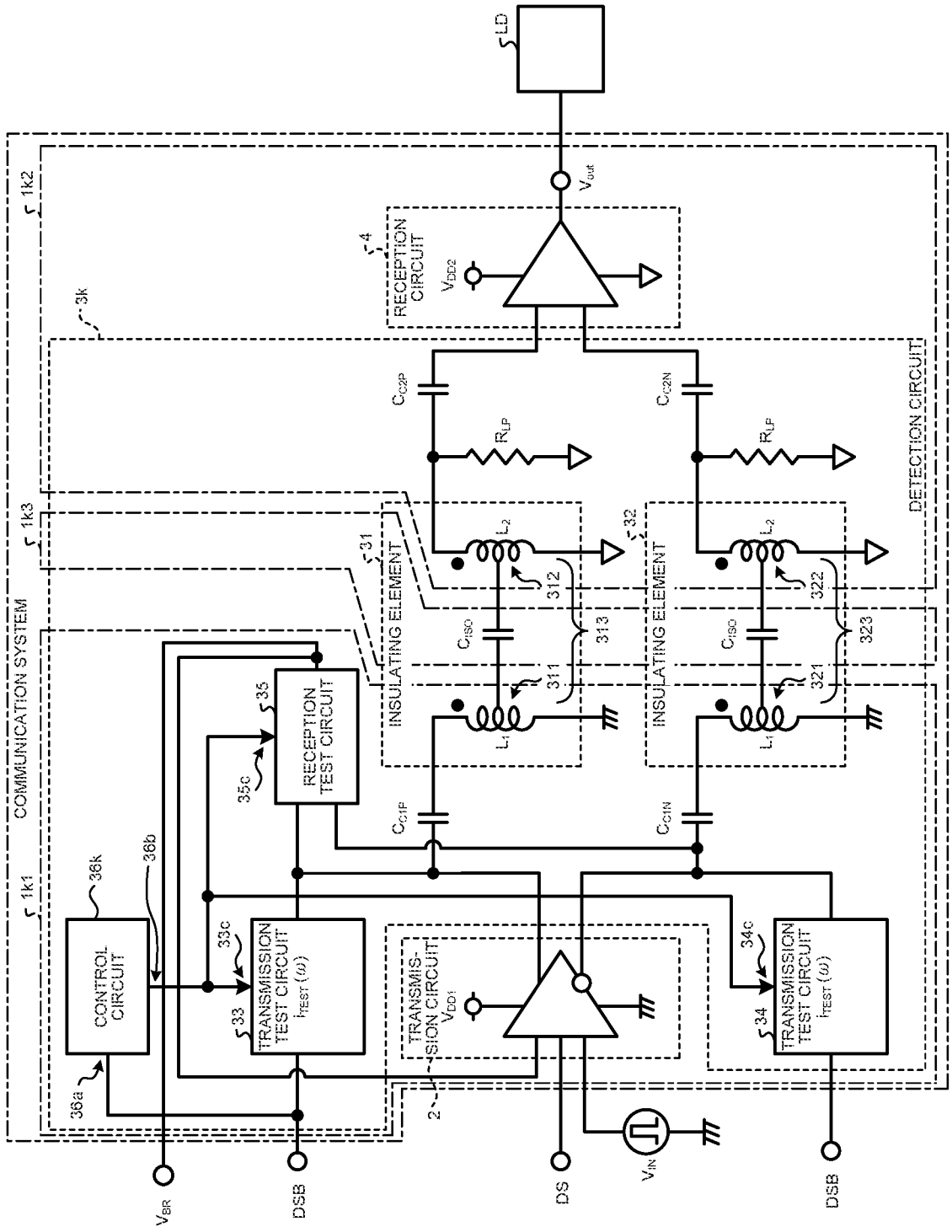
FIG. 6 is a diagram illustrating a configuration of a communication system including a detection circuit according to a third modification of the embodiment.

Furthermore, as a third modification of the embodiment, a communication system 1k may be configured as illustrated in FIG. 6. FIG. 6 is a diagram illustrating a configuration of a communication system 1k including a detection circuit 3k according to the third modification of the embodiment.

The communication system 1k includes a detection circuit 3k instead of the detection circuit 3 (see FIG. 1). The detection circuit 3k further includes a control circuit 36k. The communication system 1k may be implemented to include a transmission-side region 1k1, an insulating layer 1k3, and a reception-side region 1k2. In this case, a transmission circuit 2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1k1. A secondary-side portion (an inductive element 312) of the insulating element 31, a secondary-side portion (an inductive element 322) of the insulating element 32, and a reception circuit 4 are mounted on the reception-side region 1k2. The transmission-side region 1k1 and the reception-side region 1k2 are insulated from each other via the insulating layer 1k3. The primary-side portion of the insulating element 31 and the secondary-side portion of the insulating element 31 are insulated from each other via the insulating layer 1k3. The primary-side portion of the insulating element 32 and the secondary-side portion of the insulating element 32 are insulated from each other via the insulating layer 1k3. The insulating layer 1k3 may be any of a silicon oxide film, a silicon nitride film, and a polyimide film or likes.

An input node 36a of the control circuit 36k receives an inverted disable signal DSB, and an output node 36b of the control circuit 36k is connected to a control node 33c of the transmission test circuit 33, a control node 34c of the transmission test circuit 34, and a control node 35c of the reception test circuit 35. As a result, the control circuit 36k can supply a control signal to each of the transmission test circuit 33, the transmission test circuit 34, and the reception test circuit 35 to control them.

For example, in order to increase a difference in voltage between presence and absence of deterioration, it is effective to set a frequency of a test signal to a specific frequency $\omega_0$ as illustrated in FIG. 3. For example, the frequency $\omega_0$ is a resonance frequency of a loop including the inductive element 311, the parasitic capacitor $C_{ISO}$, and the inductive element 312.

However, the resonance frequency is affected by manufacturing variations of the elements, and the characteristics of the elements may vary.

For example, it is assumed that a resonance frequency of a circuit loop including the inductive element 311, the parasitic capacitor $C_{ISO}$, and the inductive element 312 is $\omega_1$, and a resonance frequency of a circuit loop including the inductive element 321, the parasitic capacitor $C_{ISO}$, and the inductive element 322 is $\omega_1$. In this case, the control circuit 36k illustrated in FIG. 6 controls the transmission test circuit 33 so that a test signal $i_{TEST}(\omega_1)$ having a frequency $\omega_1$ is supplied from the transmission test circuit 33 to the insulating element 31. The control circuit 36k controls the transmission test circuit 34 such that a test signal $i_{TEST}(\omega_2)$ having a frequency $\omega_1$ is supplied from the transmission test circuit 34 to the insulating element 32.

Here, ω1 is smaller than $\omega_0$, and $Z_{IN}(\omega_1)$ is larger than $Z_{IN}(\omega_0)$. As a definition of a parameter $\Delta Z_{IN} = Z_{IN}(\omega_1) - Z_{IN}(\omega_0)$ and as a definition of a differential voltage $\Delta v_{MEAS}$ between the insulating transformers 313 and 323 depending on the parameter $\Delta Z_{IN}$, a magnitude of the parameter $\Delta Z_{IN}$ and the differential voltage $\Delta v_{MEAS}$ between the insulating transformers 313 and 323 change depending on how much the insulating transformer 313 and 323 deteriorate over time. The reception test circuit 35 can detect a change over time between the insulating transformers 313 and 323 based on whether or not an amount of change in the differential voltage $\Delta v_{MEAS}$ with respect to a standard value exceeds the threshold.

Figure 7:
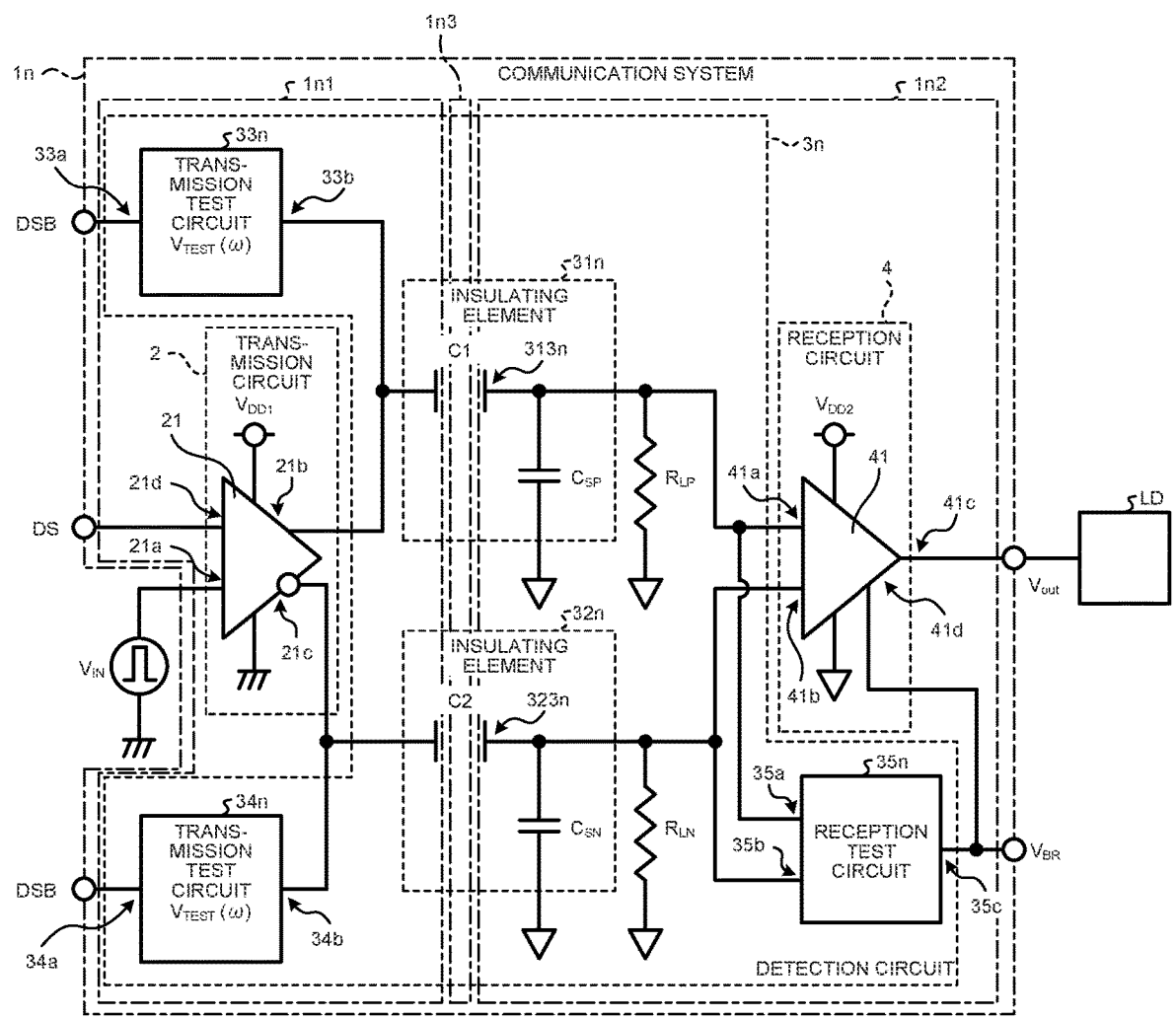
FIG. 7 is a diagram illustrating a configuration of a communication system including a detection circuit according to a fourth modification of the embodiment.

Furthermore, as a fourth modification of the embodiment, a communication system 1n may be configured as illustrated in FIG. 7. FIG. 7 is a diagram illustrating a configuration of a communication system 1n including a detection circuit 3n according to the fourth modification of the embodiment.

In the embodiment and the first to third modifications of the embodiment, it has been assumed that the insulating elements are insulation transformers. However, a deterioration over time can be detected even in a case where the insulating elements are insulating capacitors.

In the communication system 1n, an insulating element 31n includes an insulating capacitor 313n instead of the insulating transformer 313 (see FIG. 1), and further includes a parasitic capacitor $C_{SP}$. The communication system 1n may be implemented to include a transmission-side region 1n1, an insulating layer 1n3, and a reception-side region 1n2. In this case, a transmission circuit 2, transmission test circuits 33 and 34, a primary-side portion of an insulating element 31n (a left side electrode of the insulating capacitor 313n), and a primary-side portion of an insulating element 32 (a left side electrode of the insulating capacitor 323n) are mounted on the transmission-side region 1n1. A reception test circuit 35, a secondary-side portion of the insulating element 31n (a right side electrode of the insulating capacitor 313n), a secondary-side portion of the insulating element 32n (a right side electrode of the insulating capacitor 323n), and a reception circuit 4 are mounted on the reception-side region 1n2. The transmission-side region 1n1 and the reception-side region 1n2 are insulated from each other via the insulating layer 1n3. The primary-side portion of the insulating element 31n and the secondary-side portion of the insulating element 31n are insulated from each other via the insulating layer 1n3. The primary-side portion of the insulating element 32n and the secondary-side portion of the insulating element 32n are insulated from each other via the insulating layer 1n3. The insulating layer 1n3 may be any of a silicon oxide film, a silicon nitride film, and a polyimide film or likes.

The insulating capacitor 313n has one end connected to the transmission test circuit 33n and the transmission circuit 2, and the other end connected to the reception test circuit 35n and the reception circuit 4. The parasitic capacitor $C_{SP}$ has one end connected to a line connecting the other end of the insulating capacitor 313n and one end of the resistive element $R_{LP}$ to each other, and the other end connected to the ground potential.

The insulating element 32n includes an insulating capacitor 323n instead of the insulating transformer 323 (see FIG. 1), and further includes a parasitic capacitor $C_{SN}$. The insulating capacitor 323n has one end connected to the transmission test circuit 34n and the transmission circuit 2, and the other end connected to the reception test circuit 35n and the reception circuit 4. The parasitic capacitor $C_{SN}$ has one end connected to a line connecting the other end of the insulating capacitor 323n and one end of the resistive element $R_{LN}$ to each other, and the other end connected to the ground potential.

The insulating capacitor 313n and the insulating capacitor 323n can be formed by disposing metal plates at both ends of the insulating layer, respectively. For example, the insulating layer can be an insulating layer having a thickness of 10 to 30 μm, which is one digit thinner than an insulation interval (400 μm or more) between the photocouplers by a mold resin.

In the fourth modification of the embodiment, by configuring the two insulating capacitors 31n and 32n as a differential transmission system in which the transmission test circuits 33n and 34n are disposed on the transmission side and the reception test circuit 35n is disposed on the reception side, insulation fault (i.e., a sign of an insulation failure) can be detected as in the embodiment.

When the disable signal DS is at an L level, the transmission test circuits 33n and 34n and the reception test circuit 35n are disabled, and the transmission circuit 2 is enabled to perform communication via the insulating capacitors 313n and 323n.

When the disable signal DS is at an H level, the transmission test circuits 33n and 34n and the reception test circuit 35n are enabled, and the transmission circuit 2 is disabled to be operated in the test mode. In the test mode operation, substantially the same test signal $V_{TEST}(\omega)$ is applied from the transmission test circuit 33n and the transmission test circuit 34n to the insulating element 33n and the insulating element 34n, respectively.

When the insulating elements 31n and 32n are in good condition, the output voltages of the insulating elements 31n and 32n are substantially the same, and accordingly, a differential voltage input to the reception test circuit 35n is about 0 V.

When an insulation leak occurs in one of the insulating elements (the insulating element 31n or the insulating element 32n), a differential voltage corresponding to the insulation leak is input to the reception test circuit 35n. When the differential voltage larger than the threshold is input to the reception test circuit 35n, the reception test circuit 35n performs control so that an unnecessary output Vout is not output from the reception circuit 4 to a load LD.

Figure 8:
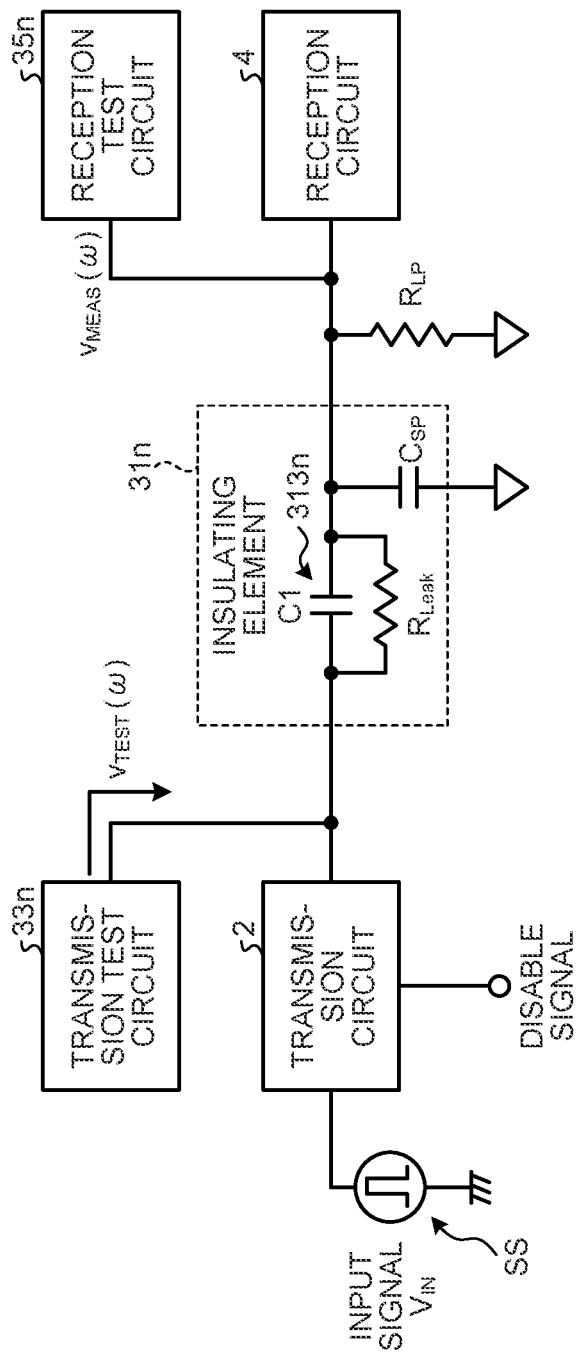
FIG. 8 is a diagram illustrating a mechanism for detecting an abnormality in the fourth modification of the embodiment.

Now, a mechanism for detecting insulation fault according to the fourth modification of the embodiment will be described in detail. A mechanism for detecting insulation fault in the insulating capacitor will be described with reference to FIG. 8. FIG. 8 is a diagram obtained by extracting a P-side portion of FIG. 7.

When the disable signal DS is at the H level, it is preferable that the transmission circuit 2 is in a disable operation state and the transmission circuit 2 outputs Hi-Z (a high impedance). In this state, when a test signal $V_{TEST}(\omega)$ is output from the transmission test circuit 33n, most of the test signal $V_{TEST}(\omega)$ flows to the insulating capacitor 313n rather than flowing to the output terminal of the transmission circuit 2. The test signal $V_{TEST}(\omega)$ may be a voltage signal depending on a frequency co.

The test signal $V_{TEST}(\omega)$ is transmitted from the primary side to the secondary side through the insulating capacitor 313n, and the reception test circuit 35n receives a test voltage $v_{MEAS\ (\omega)}$. A transfer function H of the insulating capacitor 313n is determined by $C1/C_{SP}/R_{LP}/R_{Leak}$, and the low-frequency transfer function H greatly changes depending on a resistance value $R_{Leak}$ of an insulation leak path.

Therefore, the resistance value $R_{Leak}$ of the insulation leak path can be detected as a change in the response signal $v_{MEAS}(\omega)$. The detection sensitivity is higher as the frequency $\omega_0$ of the test signal $V_{TEST}$ is lower. However, since a high-pass filter HPF (C1 and $R_{LP}$) is added as a countermeasure against CMTI in a normal system, the response signal $v_{MEAS}$ has a lower level as the frequency $\omega_0$ of the test signal $V_{TEST}$ is lower. Therefore, the frequency $\omega_0$ of the test signal $V_{TEST}$ can be determined so that the level of the response signal $v_{MEAS}$ becomes an appropriate level while the detection sensitivity satisfies the required level.

Figure 9:
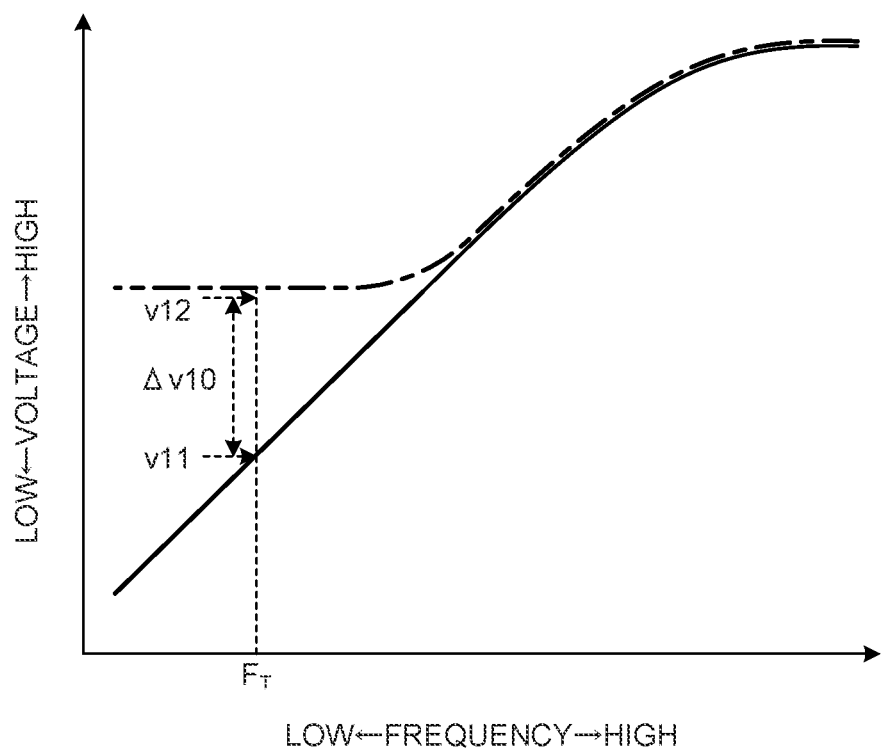
FIG. 9 is a diagram illustrating a difference in voltage of an insulating element depending on whether or not the insulating element deteriorates in the fourth modification of the embodiment.

FIG. 9 illustrates an example of the response signal $v_{MEAS\ (\omega)}$ when the test signal $v_{TEST}(\omega)$ is input. In FIG. 9, a solid line indicates a case where a deterioration over time has not occurred in the insulating element, and an alternate long and short dash line indicates a case where a deterioration over time has occurred in the insulating element and $R_{Leak}$ has become 10 kΩ.

As illustrated in FIG. 9, concerning the insulating element in which a deterioration over time has not occurred, a transfer function has a small value at a frequency $F_T$ in the low frequency band, and a voltage v11 is detected at a low level. When $R_{Leak}$ is 10 kΩ, the transfer function has a large value at the frequency $F_T$ in the low frequency band, and a voltage v12 is detected at a high level. In the example of FIG. 9, a short circuit mode in which the resistance is 10 kΩ can be detected as a differential voltage Δv10 corresponding to an impedance change by five times (14 dB).

In the differential signal transmission system of FIG. 7, in a case where the insulating element 31n and the insulating element 32n are tested using the test signal $v_{TEST}(\omega)$, it can be seen that a large differential voltage Δv10 is input to the reception test circuit 35n when a deterioration has occurred over time in one of the insulating elements (the insulating element 31n or the insulating element 32n). As a result, a deterioration in insulation of the insulating element according to the lapse of time can be detected with high sensitivity, and insulation fault (i.e., a sign of an insulation failure) of the insulating element can be detected. When the differential voltage Δv10 larger than the threshold is input to the reception test circuit 35n, the reception test circuit 35n performs control so that an unnecessary output is not output from the reception test circuit 35n to a load circuit LD.

The load impedances of the insulating capacitors 313n and 323n may not be resistances.

As described above, when the insulating capacitors 313n and 323n are used as the insulating elements 31n and 32n, a deterioration of the insulating element 31n or 32n can be detected with high sensitivity by using a test signal $v_{TEST}(\omega)$ having $F_T$ as a frequency ω in the low frequency band. Furthermore, a deterioration of the insulating element 31n or 32n over time can be detected with high sensitivity by changing the frequency ω of the test signal $V_{TEST}(\omega)$.

Figure 10:
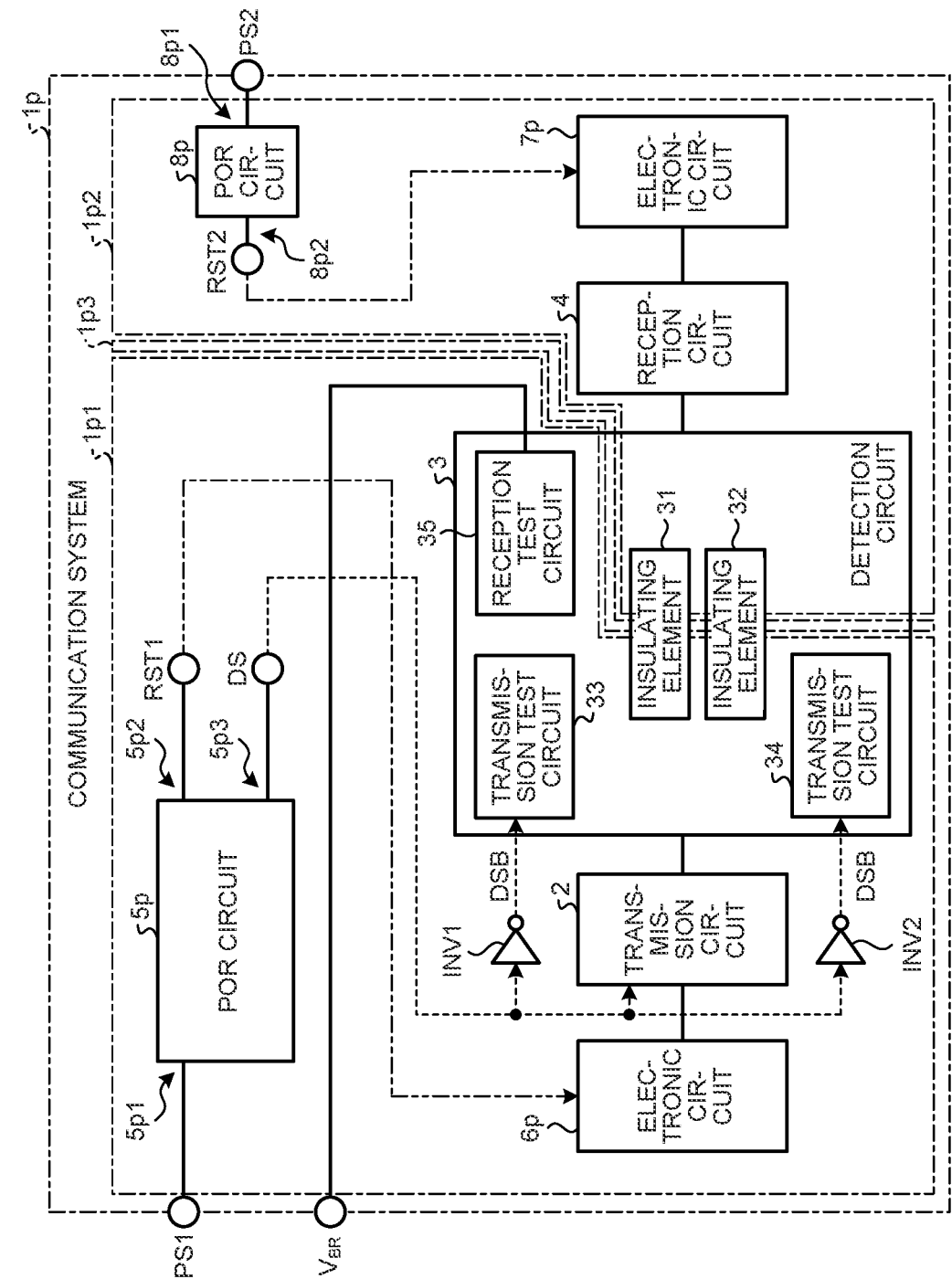
FIG. 10 is a circuit diagram illustrating a configuration of a communication system including a power on reset (POR) circuit according to a fifth modification of the embodiment.

Furthermore, in a communication system 1p as a fifth modification of the embodiment, a disable signal DS may be generated by a power on reset (POR) circuit 5p as illustrated in FIG. 10. FIG. 10 is a circuit diagram illustrating a configuration of a communication system 1p including a POR circuit 5p according to the fifth modification of the embodiment.

As compared with the communication system 1 (see FIG. 1), the communication system 1p further includes a POR circuit 5p, an electronic circuit 6p, an electronic circuit 7p, an inverter INV1, and an inverter INV2. The communication system 1p may be implemented to include a transmission-side region 1p1, an insulating layer 1p3, and a reception-side region 1p2. In this case, a POR circuit 5p, an electronic circuit 6p, a transmission circuit 2, an inverter INV1, an inverter INV2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1p1. A POR circuit 8p, a secondary-side portion (an inductive element 312) of the insulating element 31, a secondary-side portion (an inductive element 322) of the insulating element 32, a reception circuit 4, and an electronic circuit 7p are mounted on the reception-side region 1p2. The transmission-side region 1p1 and the reception-side region 1p2 are insulated from each other via the insulating layer 1p3. The primary-side portion of the insulating element 31 and the secondary-side portion of the insulating element 31 are insulated from each other via the insulating layer 1p3. The primary-side portion of the insulating element 32 and the secondary-side portion of the insulating element 32 are insulated from each other via the insulating layer 1p3. The insulating layer 1p3 may be any of a silicon oxide film, a silicon nitride film, and a polyimide film or likes.

The POR circuit 5p is a circuit that initializes the communication system 1p after a power supply voltage is stabilized at a predetermined voltage (e.g., a recommended voltage) for a predetermined time at the time of starting the power supply to the communication system 1p. The predetermined time may be experimentally determined in advance as a time required for stabilizing the power supply to the communication system 1p.

The POR circuit 5p is connected between a power supply terminal PS1, the transmission circuit 2, the detection circuit 3, and the electronic circuit 6p. The POR circuit 5p has an input node 5p1 connected to the power supply terminal PS1, an output node 5p2 connected to the electronic circuit 6p, and an output node 5p3 connected to the transmission circuit 2 and connected to the transmission test circuits 33 and 34 via the inverters INV1 and INV2, respectively. The electronic circuit 6p is connected to an input side of the transmission circuit 2.

The POR circuit 8p is connected between a power supply terminal PS2, the reception circuit 4, and the electronic circuit 7p. The POR circuit 8p has an input node 8p1 connected to the power supply terminal PS2, and an output node 8p2 connected to the electronic circuit 7p. The electronic circuit 7p is connected to an output side of the reception circuit 4.

In the communication system 1p, when to issue a disable signal DS is based on the POR circuit 5p. The POR circuit 5p monitors a power supply voltage received at the input node 5p1 from the outside via the power supply terminal PS1. The POR circuit 8p monitors a power supply voltage received at the input node 8p1 from the outside via the power supply terminal PS2.

At the time of starting the power supply, when a predetermined time elapses after the power supply voltage received at the input node 5p1 reaches a predetermined voltage (e.g., a lower limit value of a recommended voltage range), the POR circuit 5p issues a reset pulse signal RST1, and the electronic circuit 6p is reset.

At the time of starting the power supply, when a predetermined time elapses after the power supply voltage received at the input node 8p1 reaches a predetermined voltage (e.g., a lower limit value of a recommended voltage range), the POR circuit 8p issues a reset pulse signal RST2, and the electronic circuit 7p is reset.

According to the cancellation of the reset state, the POR circuit 5p issues a disable signal DS. The POR circuit 5p generates a disable signal DS at an active level and supplies the generated disable signal DS to the transmission circuit 2, the inverter INV1, and the inverter INV2. In response to the disable signal DS at the active level, the transmission circuit 2 is disabled, and the transmission test circuits 33 and 34 receive inverted disable signals DSB generated by logically inverting the disable signal DS through the inverters INV1 and INV2, respectively. In response to the inverted disable signals DSB at the active level (e.g., an L level), the transmission test circuits 33 and 34 are enabled to transmit test signals to the insulating elements 31 and 32 (see FIG. 1). As a result, the detection circuit 3 detects insulation fault (i.e., a sign of an insulation failure) in the insulating elements 31 and 32.

When insulation fault (i.e., a sign of an insulation failure) is not detected, a detection signal $V_{BR}$ is not issued from the reception test circuit 35. In addition, the signal is input from the electronic circuit 6p to the transmission circuit 2, the signal is transmitted from the transmission circuit 2 to the reception circuit 4 through the insulating elements 31 and 32, and the signal is output from the reception circuit 4 to the electronic circuit 7p.

When insulation fault (i.e., a sign of an insulation failure) is detected, a detection signal $V_{BR}$ is issued from the reception test circuit 35. In response to the detection signal $V_{BR}$ at the active level, signal transmission through the insulating elements 31 and 32 is not performed.

In this manner, the communication system 1p can detect insulation fault (i.e., a sign of an insulation failure) in a period during which the reset of the internal circuit is canceled at the time of starting the power supply, and perform signal transmission according to a detection result. Therefore, the signal transmission can be performed appropriately.

Figure 11:
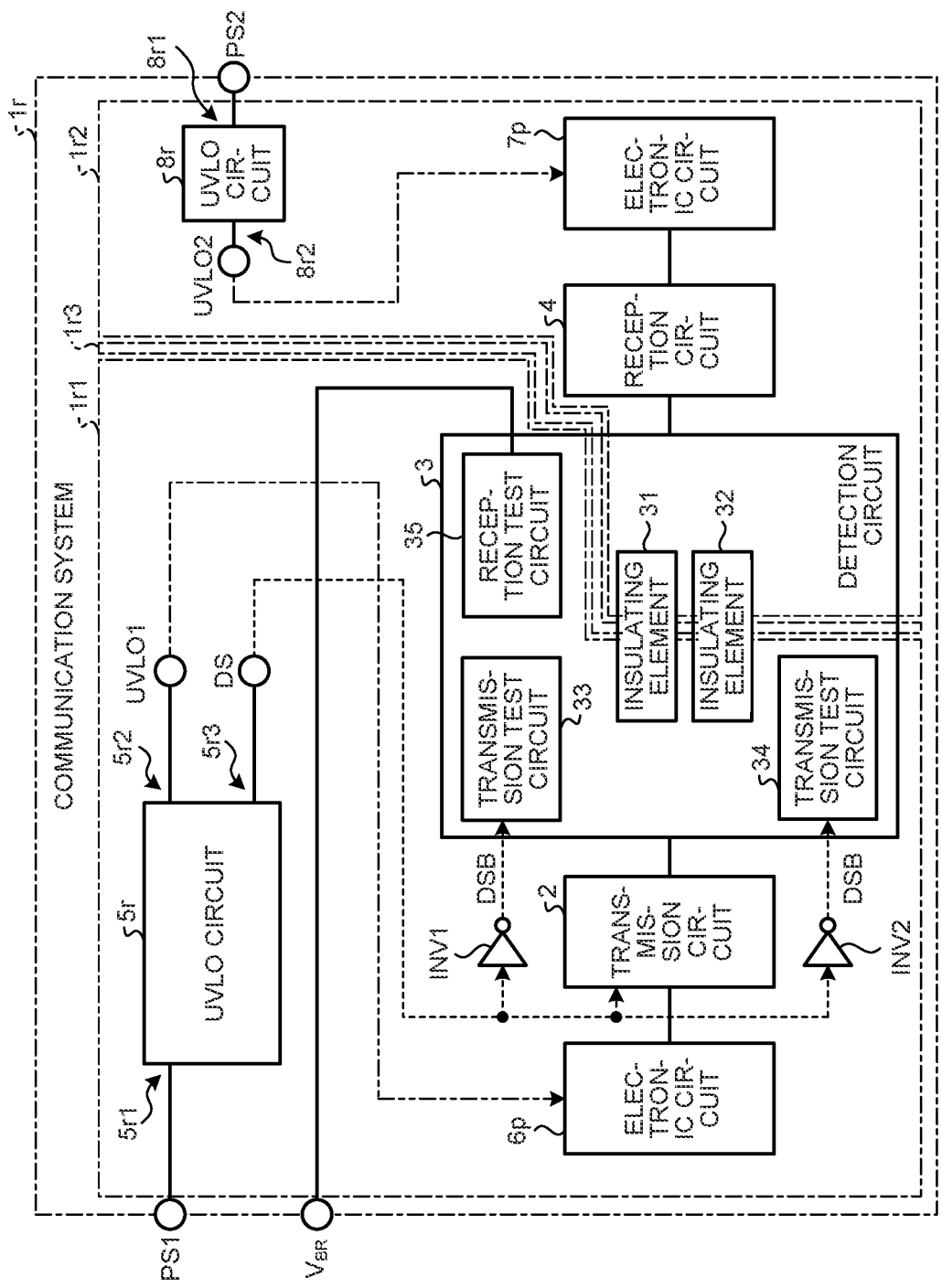
FIG. 11 is a circuit diagram illustrating a configuration of a communication system including an under-voltage lock out (UVLO) circuit according to a sixth modification of the embodiment.

Furthermore, in a communication system 1r as a sixth modification of the embodiment, a disable signal DS may be generated by an under-voltage lock out (UVLO) circuit 5r as illustrated in FIG. 11. FIG. 11 is a circuit diagram illustrating a configuration of a communication system 1r including a UVLO circuit 5r according to the sixth modification of the embodiment.

As compared with the communication system 1 (see FIG. 1), the communication system 1r further includes a UVLO circuit 5r, an electronic circuit 6p, an electronic circuit 7p, an inverter INV1, and an inverter INV2. The communication system 1r may be implemented include a transmission-side region 1r1, an insulating layer 1r3, and a reception-side region 1r2. In this case, a UVLO circuit 5r, an electronic circuit 6p, a transmission circuit 2, an inverter INV1, an inverter INV2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1r1. A UVLO circuit 8r, a secondary-side portion (an inductive element 312) of the insulating element 31, a secondary-side portion (an inductive element 322) of the insulating element 32, a reception circuit 4, and an electronic circuit 7p are mounted on the reception-side region 1r2. The transmission-side region 1r1 and the reception-side region 1r2 are insulated from each other via the insulating layer 1r3. The primary-side portion of the insulating element 31 and the secondary-side portion of the insulating element 31 are insulated from each other via the insulating layer 1r3. The primary-side portion of the insulating element 32 and the secondary-side portion of the insulating element 32 are insulated from each other via the insulating layer 1r3. The insulating layer 1r3 may be any of a silicon oxide film, a silicon nitride film, and a polyimide film or likes.

The UVLO circuit 5r is a circuit that monitors a power supply voltage of the communication system 1r, and locks out the internal circuit when the power supply voltage becomes lower than a predetermined voltage (e.g., a recommended voltage).

The UVLO circuit 5r is connected between a power supply terminal PS1, the transmission circuit 2, the detection circuit 3, and the electronic circuit 6p. The UVLO circuit 5r has an input node 5r1 connected to the power supply terminal PS1, an output node 5r2 connected to the electronic circuit 6p, and an output node 5r3 connected to the transmission circuit 2 and connected to the transmission test circuits 33 and 34 via the inverters INV1 and INV2, respectively. The electronic circuit 6p is connected to an input side of the transmission circuit 2.

The UVLO circuit 8r is connected between a power supply terminal PS2, the reception circuit 4, and the electronic circuit 7p. The UVLO circuit 8r has an input node 8r1 connected to the power supply terminal PS2, and an output node 8r2 connected to the electronic circuit 7p. The electronic circuit 7p is connected to an output side of the reception circuit 4.

In the communication system 1r, when to issue a disable signal DS is based on the UVLO circuit 5r. The UVLO circuit 5r monitors a power supply voltage received at the input node 5r1 from the outside via the power supply terminal PS1. The UVLO circuit 8r monitors a power supply voltage received at the input node 8r1 from the outside via the power supply terminal PS2.

During the operation of the communication system 1r, when the power supply voltage received at the input node 5r1 becomes lower than a predetermined voltage (e.g., a recommended voltage), the UVLO circuit 5r issues a lockout signal UVLO1. The UVLO circuit 5r supplies a lockout signal UVLO1 at an active level from the output node 5r2 to an internal circuit such as the electronic circuit 6p. As a result, the UVLO circuit 5r can lock out the internal circuit such as the electronic circuit 6p to prevent a malfunction thereof.

During the operation of the communication system 1r, when the power supply voltage received at the input node 8r1 becomes lower than a predetermined voltage (e.g., a recommended voltage), the UVLO circuit 8r issues a lockout signal UVLO2. The UVLO circuit 8r supplies a lockout signal UVLO2 at an active level from the output node 8r2 to an internal circuit such as the electronic circuit 7p. As a result, the UVLO circuit 8r can lock out the internal circuit such as the electronic circuit 7p to prevent a malfunction thereof.

When the power supply voltage received at the input node 5r1 recovers to a predetermined voltage (e.g., a recommended voltage) or more, the UVLO circuit 5r cancels the lockout signal UVLO1. The UVLO circuit 5r supplies a lockout signal UVLO1 at a non-active level from the output node 5r2 to an internal circuit such as the electronic circuit 6p. As a result, the UVLO circuit 5r can cancel the lockout of the internal circuit such as the electronic circuit 6p.

When the power supply voltage received at the input node 8r1 recovers to a predetermined voltage (e.g., a recommended voltage) or more, the UVLO circuit 8r cancels the lockout signal UVLO2. The UVLO circuit 8r supplies a lockout signal UVLO2 at a non-active level from the output node 8r2 to an internal circuit such as the electronic circuit 7p. As a result, the UVLO circuit 8r can cancel the lockout of the internal circuit such as the electronic circuit 7p.

According to the cancellation of the lockout, the UVLO circuit 5r issues a disable signal DS. The UVLO circuit 5r supplies a disable signal DS at an active level to the transmission circuit 2, the inverter INV1, and the inverter INV2. In response to the disable signal DS at the active level, the transmission circuit 2 is disabled, and the transmission test circuits 33 and 34 receive inverted disable signals DSB generated by logically inverting the disable signal DS through the inverters INV1 and INV2, respectively. In response to the inverted disable signals DSB at the active level (e.g., an L level), the transmission test circuits 33 and 34 are enabled to transmit test signals to the insulating elements 31 and 32 (see FIG. 1). As a result, the detection circuit 3 detects insulation fault (i.e., a sign of an insulation failure) in the insulating elements 31 and 32.

Figure 12:
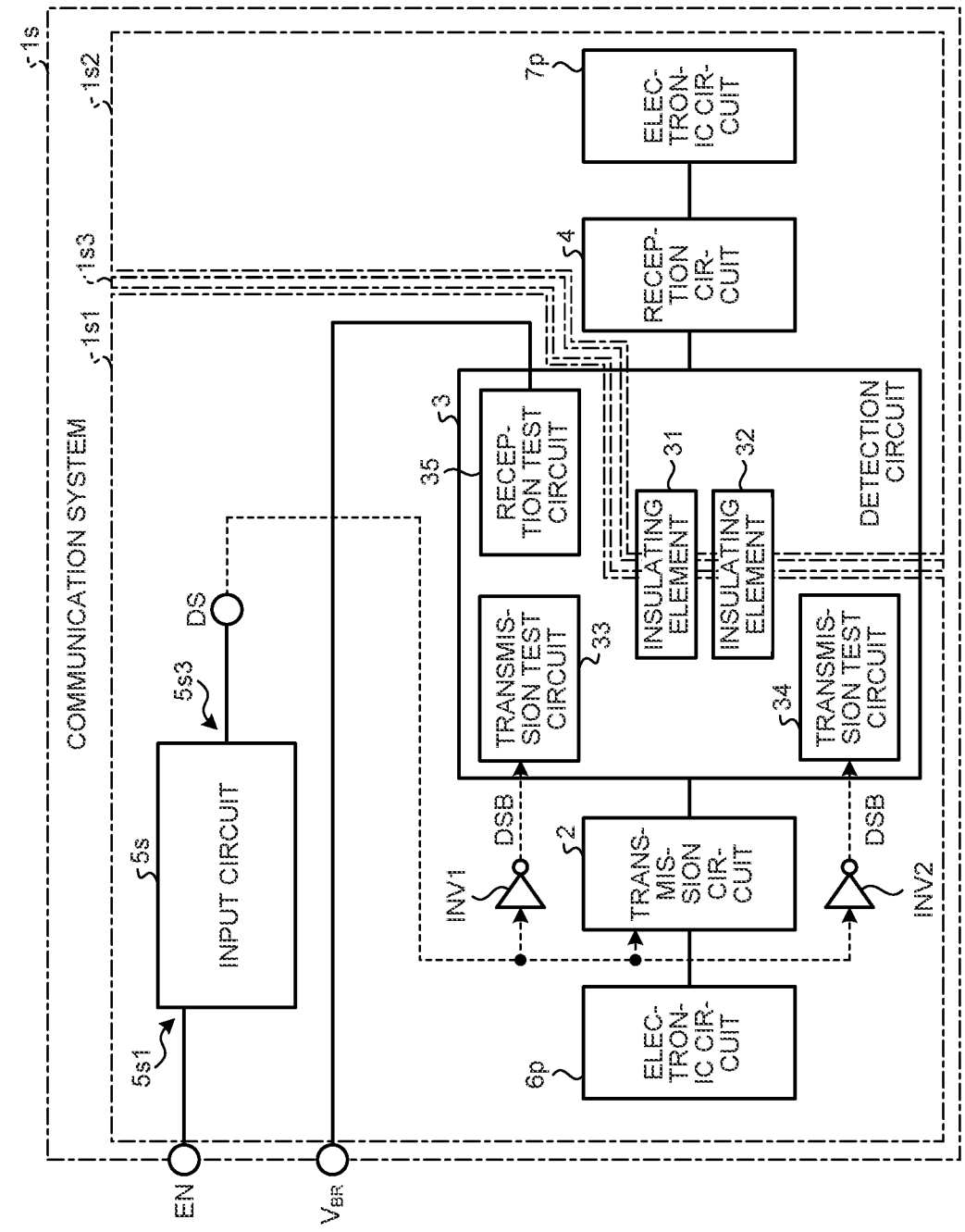
FIG. 12 is a circuit diagram illustrating a configuration of a communication system including an input circuit according to a seventh modification of the embodiment.

Furthermore, in a communication system is as a seventh modification of the embodiment, a disable signal DS may be generated by an input circuit 5s as illustrated in FIG. 12. FIG. 12 is a circuit diagram illustrating a configuration of a communication system is including an input circuit 5s according to the seventh modification of the embodiment.

As compared with the communication system 1 (see FIG. 1), the communication system is further includes an input circuit 5s, an electronic circuit 6p, an electronic circuit 7p, an inverter INV1, and an inverter INV2. The communication system is may be implemented include a transmission-side region 1s1, an insulating layer 1s3, and a reception-side region 1s2. In this case, an input circuit 5s, an electronic circuit 6p, a transmission circuit 2, an inverter INV1, an inverter INV2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1s1. A secondary-side portion (an inductive element 312) of the insulating element 31, a secondary-side portion (an inductive element 322) of the insulating element 32, a reception circuit 4, and an electronic circuit 7p are mounted on the reception-side region 1s2. The transmission-side region 1s1 and the reception-side region 1s2 are insulated from each other via the insulating layer 1s3. The primary-side portion of the insulating element 31 and the secondary-side portion of the insulating element 31 are insulated from each other via the insulating layer 1s3. The primary-side portion of the insulating element 32 and the secondary-side portion of the insulating element 32 are insulated from each other via the insulating layer 1s3. The insulating layer 1s3 may be any of a silicon oxide film, a silicon nitride film, and a polyimide film or likes.

The input circuit 5s is a circuit to which a control signal EN is input. The input circuit 5s is connected between the control terminal EN, the transmission circuit 2, and the detection circuit 3. The input circuit 5s has an input node 5s1 connected to the control terminal EN, an input node connected to the reception test circuit 35, and an output node 5s3 connected to the transmission circuit 2 and connected to the transmission test circuits 33 and 34 via the inverters INV1 and INV2, respectively. The electronic circuit 6p is connected to an input side of the transmission circuit 2. The electronic circuit 7p is connected to an output side of the reception circuit 4.

In the communication system 1s, when to issue a disable signal DS is based on the input circuit 5s. The input circuit 5s monitors a control signal EN received by the input node 5s1 from the outside via the control terminal EN. The input circuit 5s can issue or cancel a disable signal DS depending on whether the level of the control signal EN is a non-active level or an active level.

When the level of the control signal EN is a non-active level, the input circuit 5s issues a disable signal DS. The input circuit 5s generates a disable signal DS at an active level and supplies the generated disable signal DS to the transmission circuit 2, the inverter INV1, and the inverter INV2. In response to the disable signal DS at the active level, the transmission circuit 2 is disabled, and the transmission test circuits 33 and 34 receive inverted disable signals DSB generated by logically inverting the disable signal DS through the inverters INV1 and INV2, respectively. In response to the inverted disable signals DSB at the active level (e.g., an L level), the transmission test circuits 33 and 34 are enabled to transmit test signals to the insulating elements 31 and 32 (see FIG. 1). As a result, the detection circuit 3 detects insulation fault (i.e., a sign of an insulation failure) in the insulating elements 31 and 32.

When insulation fault (i.e., a sign of an insulation failure) is not detected, a detection signal $V_{BR}$ is not issued from the reception test circuit 35. The input circuit 5s stands by until the level of the control signal EN becomes an active level. When the level of the control signal EN becomes an active level, the input circuit 5s disables the transmission test circuits 33 and 34 and enables the transmission circuit 2 to shift to a normal operation state. As a result, signal transmission through the insulating elements 31 and 32 can be performed. That is, the signal is input from the electronic circuit 6p to the transmission circuit 2, the signal is transmitted from the transmission circuit 2 to the reception circuit 4 through the insulating elements 31 and 32, and the signal is output from the reception circuit 4 to the electronic circuit 7p.

When insulation fault (i.e., a sign of an insulation failure) is detected, a detection signal $V_{BR}$ is issued from the reception test circuit 35. The input circuit 5s keeps the transmission circuit 2 in the disabled state. As a result, signal transmission through the insulating elements 31 and 32 is not performed.

In this manner, the communication system is can detect insulation fault (i.e., a sign of an insulation failure) in an idle period during which the level of the control signal EN is a non-active level, and perform signal transmission according to a detection result. Therefore, the signal transmission can be performed appropriately.

Figure 13:
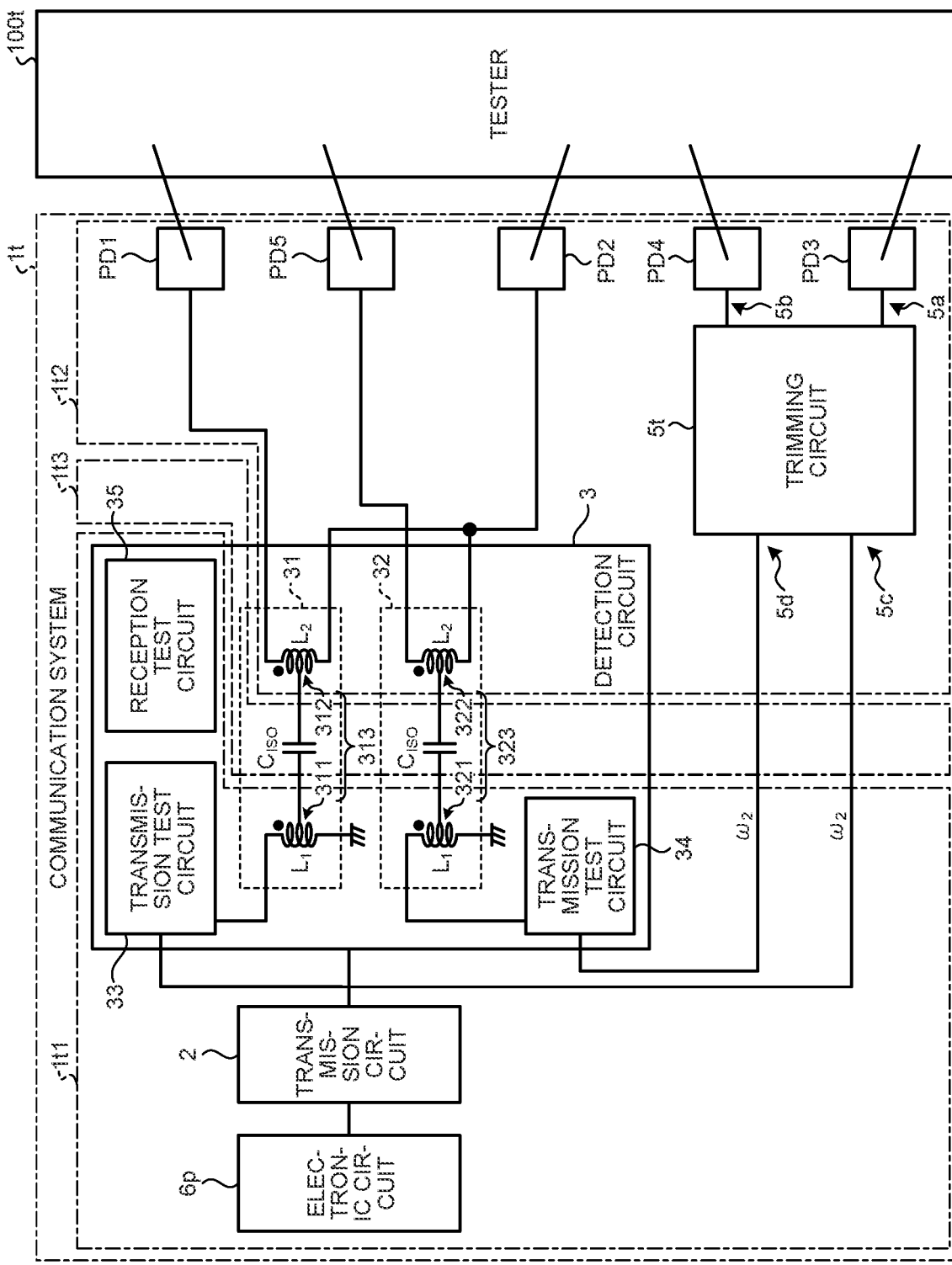
FIG. 13 is a circuit diagram illustrating a configuration of a communication system including a trimming circuit according to an eighth modification of the embodiment.

Furthermore, as an eighth modification of the embodiment, a trimming circuit 5t as illustrated in FIG. 13 may be provided in a communication system it. FIG. 13 is a circuit diagram illustrating a configuration of a communication system it including a trimming circuit 5t according to the eighth modification of the embodiment.

For example, the communication system it is implemented as a semiconductor chip, and is configured to trim the frequencies of test signals of the transmission test circuits 33 and 34 in an inspection process before shipment. FIG. 13 illustrates a configuration in a case where trimming is performed using a memory. As compared with the communication system 1 (see FIG. 1), the communication system it further includes a trimming circuit 5t, an electronic circuit 6p, an electronic circuit 7p, and plural pad electrodes PD1 to PD5. The communication system it may be implemented to include a transmission-side region 1t1, an insulating layer 1t3, and a reception-side region 1t2. In this case, an electronic circuit 6p, a transmission circuit 2, transmission test circuits 33 and 34, a reception test circuit 35, a primary-side portion (an inductive element 311) of an insulating element 31, and a primary-side portion (an inductive element 321) of an insulating element 32 are mounted on the transmission-side region 1t1. A secondary-side portion (an inductive element 312) of the insulating element 31, a secondary-side portion (an inductive element 322) of the insulating element 32, and a trimming circuit 5t are mounted, and plural pad electrodes PD1 to PD5 are disposed on the reception-side region 1t2. The transmission-side region 1t1 and the reception-side region 1t2 are insulated from each other via the insulating layer 1t3. The primary-side portion of the insulating element 31 and the secondary-side portion of the insulating element 31 are insulated from each other via the insulating layer 1t3. The primary-side portion of the insulating element 32 and the secondary-side portion of the insulating element 32 are insulated from each other via the insulating layer 1t3. The insulating layer 1t3 may be any of a silicon oxide film, a silicon nitride film, and a polyimide film or likes.

Each of the plural pad electrodes PD1 to PD5 is connected to a tester 100t. The tester 100t can measure impedances of the insulating elements 31 and 32. For example, the inductive element 312 of the insulating element 31 has one end connected to the tester 100t via the pad electrode PD1, and the other end connected to the tester 100t via the pad electrode PD2. The inductive element 322 of the insulating element 32 has one end connected to the tester 100t via the pad electrode PD5, and the other end connected to the tester 100t via the pad electrode PD2.

The tester 100t is connected to the pad electrodes PD1 and PD2, for example, by bringing probes into contact with the pad electrodes PD1 and PD2.

A test signal (a sine wave in a typical example) is output from the tester 100t, and the tester 100t measures an impedance of the insulating element 31 by detecting a response (e.g., a voltage) thereto. From a measurement result, the tester 100t calculates an expected resonance frequency $\omega_2$.

Similarly, the tester 100t is connected to the pad electrodes PD5 and PD2, for example, by bringing probes into contact with the pad electrodes PD5 and PD2.

A test signal (a sine wave in a typical example) is output from the tester 100t, and the tester 100t measures an impedance of the insulating element 32 by detecting a response (e.g., a voltage) thereto. From a measurement result, the tester 100t calculates an expected resonance frequency $\omega_2$.

The trimming circuit 5t has an input node 5a connected to the pad electrode PD3, an input node 5b connected to the pad electrode PD4, an output node 5c connected to the transmission test circuit 33, and an output node 5d connected to the transmission test circuit 34.

The tester 100t supplies the resonance frequency $\omega_2$ calculated for the insulating element 31 to the trimming circuit 5t via the pad electrode PD3. The trimming circuit 5t stores the resonance frequency $\omega_2$ in association with the insulating element 31. Similarly, the tester 100t supplies the resonance frequency $\omega_2$ calculated for the insulating element 32 to the trimming circuit 5t via the pad electrode PD4. The trimming circuit 5t stores the resonance frequency $\omega_2$ in association with the insulating element 32.

For example, in the test mode, the transmission test circuit 33 reads the resonance frequency $\omega_2$ from the trimming circuit 5t and sets a frequency $\omega$ of a test signal $V_{TEST}(\omega)$ to $\omega_2$, and the transmission test circuit 34 reads the resonance frequency $\omega_2$ from the trimming circuit 5t and sets a frequency $\omega$ of a test signal $V_{TEST}(\omega)$ to $\omega_2$. As a result, the resonance frequency calculated by the tester 100t and the frequency of the test signal can be substantially the same.

In this manner, the communication system 1t can trim the frequencies of the test signals of the transmission test circuits 33 and 34 to set an appropriate frequency (e.g., an optimum frequency) to be used for a test signal in the trimming circuit 5t. As a result, the communication system 1t can stably detect insulation fault (i.e., a sign of an insulation failure) in the insulating elements 31 and 32.

Although it is illustrated in FIG. 13 that trimming is performed using a memory, the communication system 1t is not limited to the trimming using the memory, and any trimming method can be applied thereto. For example, the trimming method applied to the communication system 1t may be a Zener zap trimming method, a laser trimming method, or a fuse blow trimming method. The Zener zap trimming method is a trimming method in which plural Zener diodes are selectively broken and short-circuited by applying a high voltage thereto to obtain a desired electrical characteristic corresponding to a trimming value. The laser trimming method is a trimming method in which plural metals are selectively cut using a laser to obtain a desired electrical characteristic corresponding to a trimming value. The fuse blow trimming method is a trimming method in which plural fuse circuits are selectively activated to obtain a desired electrical characteristic corresponding to a trimming value.

Figure 14:
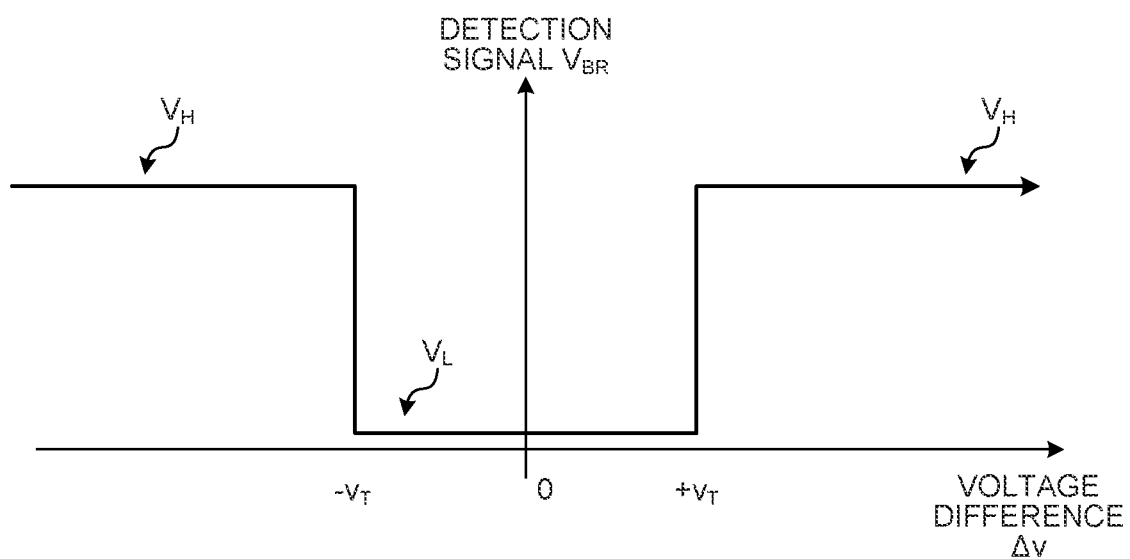
FIG. 14 is a diagram illustrating an operation of a reception test circuit according to a ninth modification of the embodiment.

Furthermore, as a ninth modification of the embodiment, the reception test circuit 35 of the communication system 1 may be configured to perform differential comparison having an offset width (a dead zone) as illustrated in FIG. 14. FIG. 14 is a diagram illustrating an operation of the reception test circuit 35 according to the ninth modification of the embodiment, exemplifying input/output characteristics of the reception test circuit 35.

In the ninth modification, a differential voltage is input to the reception test circuit 35. For example, the differential voltage may be a voltage difference $\Delta v(=v_{311}-v_{321})$ that is a difference between an input voltage $v_{311}$ of the inductive element 311 and an input voltage $v_{321}$ of the inductive element 321. The voltage difference $\Delta v$ is a positive value when the input voltage $v_{311}$ is larger than the input voltage $v_{321}$, and is a negative value when the input voltage $v_{311}$ is smaller than the input voltage $v_{321}$. Offset voltages $+v_T$ and $-v_T$ ($v_T>0$) are provided to the reception test circuit 35. When the voltage difference $\Delta v$ becomes equal to or larger than $+v_T$ or equal to or smaller than $-v_T$, the reception test circuit 35 issues a detection signal $V_{BR}$. When the input differential voltage $\Delta v$ is smaller than $+v_T$ or larger than $-v_T$, the reception test circuit 35 generates and outputs a detection signal $V_{BR}$ at a non-active level (e.g., a low level $V_L$). When the voltage difference $\Delta v$ is equal to or larger than $+v_T$ or equal to or smaller than $-v_T$, the reception test circuit 35 generates and outputs a detection signal $V_{BR}$ at an active level (e.g., a high level $V_H$).

As illustrated in FIG. 14, by providing the dead zone ($-v_T$ to $+v_T$) with respect to a differential voltage $V_{TEST}(\omega)$ as a test voltage due to an element variation, the reception test circuit 35 can be stably operated. Note that although the input is a differential voltage in FIG. 14, the same applies to a case where two single-phase voltages are compared with each other (e.g., the operation of the reception test circuit 35 illustrated in FIG. 5).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A detection circuit comprising:
a first insulating element;
a second insulating element;
a first transmission test circuit connected to the first insulating element;
a second transmission test circuit connected to the second insulating element; and
a reception test circuit connected to each of the first insulating element and the second insulating element to output a detection signal corresponding to a difference between a voltage of the first insulating element and a voltage of the second insulating element.

2. The detection circuit according to claim 1, wherein
the first transmission test circuit, the second transmission test circuit, and the reception test circuit are connected to primary sides of the first insulating element and the second insulating element.

3. The detection circuit according to claim 1, wherein
the first transmission test circuit, the second transmission test circuit, and the reception test circuit are connected to secondary sides of the first insulating element and the second insulating element.

4. The detection circuit according to claim 1, wherein
the first transmission test circuit and the second transmission test circuit are connected to primary sides of the first insulating element and the second insulating element, and the reception test circuit is connected to secondary sides of the first insulating element and the second insulating element.

5. The detection circuit according to claim 1, wherein
the first transmission test circuit includes an output node connected to a primary side of the first insulating element,
the second transmission test circuit includes an output node connected to a primary side of the second insulating element, and
the reception test circuit includes a first input node connected to the primary side of the first insulating element and a second input node connected to the primary side of the second insulating element.

6. The detection circuit according to claim 1, wherein
the first transmission test circuit includes an output node connected to a secondary side of the first insulating element,
the second transmission test circuit includes an output node connected to a secondary side of the second insulating element, and
the reception test circuit includes a first input node connected to the secondary side of the first insulating element and a second input node connected to the secondary side of the second insulating element.

7. The detection circuit according to claim 1, wherein
the first transmission test circuit includes an output node connected to a primary side of the first insulating element,
the second transmission test circuit includes an output node connected to a primary side of the second insulating element, and
the reception test circuit includes a first input node connected to a secondary side of the first insulating element and a second input node connected to a secondary side of the second insulating element.

8. The detection circuit according to claim 2, wherein
the first transmission test circuit transmits a first test signal to the first insulating element, and
the second transmission test circuit transmits a second test signal corresponding to the first test signal to the second insulating element.

9. The detection circuit according to claim 8, wherein
the reception test circuit outputs the detection signal at a first level when the difference between the voltage of the first insulating element and the voltage of the second insulating element is equal to or smaller than a threshold, and outputs the detection signal at a second level when the difference between the voltage of the first insulating element and the voltage of the second insulating element is larger than the threshold.

10. The detection circuit according to claim 9, further comprising
a control circuit that controls a frequency of the first test signal to a first frequency,
wherein the first transmission test circuit transmits the first test signal having the first frequency to the first insulating element, and
the second transmission test circuit transmits the second test signal having the first frequency to the second insulating element.

11. The detection circuit according to claim 9, wherein
the first transmission test circuit reads a second frequency from a storage circuit that stores the second frequency that the first test signal is trimmed to have, and transmits the first test signal having the second frequency to the first insulating element, and
the second transmission test circuit reads the second frequency from the storage circuit, and transmits the second test signal having the second frequency to the second insulating element.

12. A communication system comprising:
the detection circuit according to claim 1, the detection circuit including a first input node disposed on a primary side of the first insulating element, a second input node disposed on a primary side of the second insulating element, a first output node disposed on a secondary side of the first insulating element, and a second output node disposed on a secondary side of the second insulating element;
a transmission circuit connected to each of the first input node and the second input node of the detection circuit; and
a reception circuit connected to each of the first output node and the second output node of the detection circuit.

13. The communication system according to claim 12, wherein
the transmission circuit is deactivated during a first period, and operable during a second period, and
both the first transmission test circuit and the second transmission test circuit operate during the first period, and are deactivated during the second period.

14. The communication system according to claim 13, wherein,
during the first period, the reception test circuit outputs the detection signal at a first level when the difference between the voltage of the first insulating element and the voltage of the second insulating element is equal to or smaller than a threshold, and outputs the detection signal at a second level when the difference between the voltage of the first insulating element and the voltage of the second insulating element is larger than the threshold, and
the transmission circuit performs a signal transmission operation during the second period when receiving the detection signal at the first level, and stops the signal transmission operation during the second period when receiving the detection signal at the second level.

15. The communication system according to claim 13, further comprising
a generation circuit that generates a disable signal,
wherein the transmission circuit is deactivated during the first period in which the disable signal is at an active level, and operable during the second period in which the disable signal is at a non-active level, and
both the first transmission test circuit and the second transmission test circuit operate during the first period in which the disable signal is at an active level, and are deactivated during the second period in which the disable signal is at a non-active level.

16. The communication system according to claim 15, wherein the generation circuit includes a power on reset (POR) circuit that is capable of resetting a predetermined circuit when the communication system is started, and transits the disable signal from the non-active level to the active level when the resetting of the predetermined circuit is canceled.

17. The communication system according to claim 15, wherein the generation circuit includes an under voltage lock out (UVLO) circuit that is capable of locking out a predetermined circuit when a power supply voltage of the communication system is lower than a predetermined voltage, and transits the disable signal from the non-active level to the active level when the locking out of the predetermined circuit is canceled.

18. The communication system according to claim 15, wherein the generation circuit includes an input circuit to which an enable signal is input, the input circuit transiting the disable signal from the non-active level to the active level when the enable signal is at a non-active level.

19. A communication system comprising:

the detection circuit according to claim 1, the detection circuit including a first input node disposed on a primary side of the first insulating element, a second input node disposed on a primary side of the second insulating element, a first output node disposed on a secondary side of the first insulating element, and a second output node disposed on a secondary side of the second insulating element;

a first transmission circuit connected to the first input node of the detection circuit;

a second transmission circuit connected to the second input node of the detection circuit;

a first reception circuit connected to the first output node of the detection circuit; and a second reception circuit connected to the second output node of the detection circuit.

20. A communication system comprising:

the detection circuit according to claim 1; and a storage circuit that stores a second frequency that a first test signal is trimmed to have, wherein the first transmission test circuit reads the second frequency from the storage circuit that stores the second frequency that the first test signal is trimmed to have, and transmits the first test signal having the second frequency to the first insulating element, the second transmission test circuit reads the second frequency from the storage circuit, and transmits a second test signal having the second frequency to the second insulating element.

\* \* \* \* \*